(12) United States Patent
McCarthy, Jr. et al.

(10) Patent No.: US 11,814,033 B2
(45) Date of Patent: Nov. 14, 2023

(54) AFTERTREATMENT HEAT UP STRATEGIES IN VEHICLES WITH HYBRID POWERTRAINS

(71) Applicant: Eaton Intelligent Power Limited, Dublin (IE)

(72) Inventors: James E. McCarthy, Jr., Kalamazoo, MI (US); Mihai Dorobantu, Mission Viejo, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/077,625

(22) Filed: Dec. 8, 2022

(65) Prior Publication Data
US 2023/0174049 A1    Jun. 8, 2023

Related U.S. Application Data

(60) Provisional application No. 63/288,594, filed on Dec. 11, 2021, provisional application No. 63/287,487, (Continued)

(51) Int. Cl.
*B60W 20/16*    (2016.01)
*F01N 3/20*    (2006.01)
(Continued)

(52) U.S. Cl.
CPC ......... *B60W 20/16* (2016.01); *B01D 53/9418* (2013.01); *B01D 53/9431* (2013.01);
(Continued)

(58) Field of Classification Search
CPC ...... B60W 20/16; B60W 10/06; B60W 10/08; B01D 53/9418; B01D 53/9431;
(Continued)

(56) References Cited

U.S. PATENT DOCUMENTS 5,979,158 A    11/1999    Kaiser et al.
8,327,622 B2    12/2012    Sano et al.
(Continued)

FOREIGN PATENT DOCUMENTS

DE    19548120 C1    1/1997
DE    102017130695 A1 *    6/2019    ............... F01N 9/00
(Continued)

OTHER PUBLICATIONS

International Search Report and Written Opinion issued in International Application No. PCT/EP2022/025558, dated Feb. 6, 2023, 9 pages.
(Continued)

*Primary Examiner* — Brian P Sweeney
(74) *Attorney, Agent, or Firm* — Talem IP Law, LLP

(57) ABSTRACT

A vehicle hybrid powertrain includes an internal combustion engine; an electrical drivetrain; a light-off selective catalytic reduction (LO-SCR) device coupled to receive exhaust from the internal combustion engine; and a control system that directs cylinder deactivation (CDA) of the internal combustion engine and controls heat applied to the LO-SCR device.

29 Claims, 15 Drawing Sheets

Related U.S. Application Data filed on Dec. 8, 2021, provisional application No. 63/287,156, filed on Dec. 8, 2021, provisional application No. 63/287,498, filed on Dec. 8, 2021.

(51) Int. Cl.

| | | |
|---|---|---|
| *F02D 41/00* | (2006.01) | |
| *F02D 41/02* | (2006.01) | |
| *B60W 10/06* | (2006.01) | |
| *B60W 10/08* | (2006.01) | |
| *B01D 53/94* | (2006.01) | |

(52) U.S. Cl.
CPC ......... *B01D 53/9495* (2013.01); *B60W 10/06* (2013.01); *B60W 10/08* (2013.01); *F01N 3/208* (2013.01); *F01N 3/2013* (2013.01); *F01N 3/2033* (2013.01); *F01N 3/2066* (2013.01); *F02D 41/0087* (2013.01); *F02D 41/024* (2013.01); *B60W 2510/242* (2013.01)

(58) Field of Classification Search
CPC ... B01D 53/9495; F01N 3/2013; F01N 3/208; F02D 41/0087; F02D 41/024
See application file for complete search history.

(56) References Cited

U.S. PATENT DOCUMENTS

| | | | |
|---|---|---|---|
| 8,989,935 | B2 | 3/2015 | Martin et al. |
| 9,174,625 | B2 | 11/2015 | Baum et al. |
| 9,388,722 | B2 | 7/2016 | Gonze et al. |
| 10,934,918 | B1 | 3/2021 | Goffe et al. |
| 11,148,654 | B2 | 10/2021 | McCarthy, Jr. |
| 11,193,438 | B1 | 12/2021 | Zhang |
| 11,326,493 | B2 | 5/2022 | Swart et al. |
| 11,428,133 | B2 | 8/2022 | Light-Holets et al. |
| 11,473,470 | B2 | 10/2022 | Webb et al. |
| 11,499,463 | B2 | 11/2022 | Swart et al. |
| 2008/0282673 | A1 | 11/2008 | Gonze et al. |
| 2009/0282812 | A1 | 11/2009 | Hu |
| 2016/0032803 | A1 | 2/2016 | Ettireddy et al. |
| 2020/0102874 | A1 | 4/2020 | Kurtz et al. |
| 2020/0114897 | A1 | 4/2020 | Mccarthy, Jr. |
| 2021/0372312 | A1 | 12/2021 | Light-Holets et al. |
| 2021/0373312 | A1 | 12/2021 | Shimada et al. |
| 2022/0025802 | A1 | 1/2022 | Webb et al. |
| 2022/0065150 | A1 | 3/2022 | Robinson et al. |

FOREIGN PATENT DOCUMENTS

| | | |
|---|---|---|
| DE | 112018000751 T5 | 11/2019 |
| WO | 2020192973 A1 | 10/2020 |
| WO | 2021242228 A1 | 12/2021 |

OTHER PUBLICATIONS

International Search Report and Written Opinion issued in International Application No. PCT/EP2022/025559, dated Feb. 6, 2023, 9 pages.
International Search Report and Written Opinion issued in International Application No. PCT/EP2022/025560, dated Feb. 6, 2023, 9 pages.
International Search Report and Written Opinion issued in International Application No. PCT/EP2022/025563, dated Feb. 6, 2023, 10 pages.
International Search Report and Written Opinion issued in International Application No. PCT/EP2022/025561, dated Feb. 6, 2023, 11 pages.
First Office Action issued in U.S. Appl. No. 18/077,755, dated Jul. 11, 2023, 11 pages.
1 Second Office Action issued in U.S. Appl. No. 18/077,755, dated Aug. 23, 2023, 14 pages.

* cited by examiner

AFTERTREATMENT HEAT UP STRATEGIES IN VEHICLES WITH HYBRID POWERTRAINS

BACKGROUND

In the United States and elsewhere, advanced internal combustion engine and aftertreatment systems in commercial vehicles are necessary to meet upcoming nitrogen oxide ($NO_x$) and carbon dioxide ($CO_2$) regulations. The addition of the low load cycle (LLC), in-use emissions compliance, and extended idle operation increase this level of stringency. One of the challenges in lowering emissions is to effectively manage emissions at engine start-up, especially at "cold start". One approach is to include engine aftertreatment (AT) systems. Cold start refers to when there is an attempt to operate a vehicle when the engine is at a temperature that is cooler than the normal operating temperature of the engine (e.g., when the vehicle has not been operated for a time period, such as at least an hour or more).

Most aftertreatment systems include a Selective Catalytic Reduction (SCR) device to treat the exhaust by performing nitrogen oxide ($NO_x$) reduction. As is known, nitrogen oxides ($NO_x$) aftertreatment systems are temperature sensitive and there is an optimal amount of heat required for the SCR device to effectively treat the exhaust. High $NO_x$ conversion begins between 200° C. and 280° C., depending on catalyst formulation. In general, $NO_x$ conversion is optimal between 250° C. and 450° C. To bring the SCR device up to favorable temperatures, heat is applied to the aftertreatment system. In this regard, an amount of time is needed for the exhaust to heat up from the typical exhaust temperatures to the elevated temperatures that satisfy the desired 95% (or above) efficiency target.

Unfortunately, the time to achieve the temperature requirements of the SCR device particularly impede the emissions treatment process when the vehicle is in cold start since the SCR device temperature is too low to perform effective $NO_x$ reduction. Fulfilling a vehicle drive load with an internal combustion engine while the SCR device temperature is ineffective results in the release of untreated, or ineffectively treated exhaust with high levels of emissions. One solution may be to keep the vehicle drive load unfulfilled (e.g., not drive the vehicle) until the SCR device temperature is within effective temperature range. However, while delaying vehicle use until the SCR device is at an effective temperature would reduce $NO_x$ emissions, it is an unrealistic and impractical solution. Therefore, systems and methods that increase SCR device $NO_x$ reduction efficiency, without burdening the driver are needed.

BRIEF SUMMARY

Aftertreatment (AT) heat up strategies are described particularly suited for vehicles with hybrid powertrains. An aftertreatment heat up strategy in accordance with certain embodiments herein can more closely control the pollution collection characteristics of the aftertreatment.

A vehicle hybrid powertrain includes an internal combustion engine; an electrical drivetrain; a light-off selective catalytic reduction (LO-SCR) device coupled to receive exhaust from the internal combustion engine; and a control system that directs cylinder deactivation (CDA) of the internal combustion engine and controls heat applied to the LO-SCR device. The internal combustion engine can be operated in idle to generate airflow that transports heat applied to the LO-SCR device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Aftertreatment heat up strategies are described particularly suited for vehicles with hybrid powertrains. The increasingly narrowing $NO_x$ regulations require efficient $NO_x$ reduction at a selective catalytic reduction (SCR) device.

To maximize the efficiency of the SCR device's $NO_x$ reduction and improve vehicle emissions, the SCR device is heated to be in effective temperature ranges.

However, the temperature requirement of the SCR device is a particular concern during vehicle cold start operations, where the SCR device is at the lower temperatures known to be less effective at reducing $NO_x$.

Advantageously, through the techniques described herein, a vehicle with a vehicle hybrid powertrain can fulfil a vehicle drive load by powering the wheels of the vehicle with the electrical drivetrain (i.e., battery), instead of the exhaust producing engine, while the SCR device is heated to effective temperature ranges. When using the electrical drivetrain of the vehicle hybrid powertrain instead of the exhaust producing engine (e.g., internal combustion engine), the internal combustion engine (ICE) is not releasing the untreated, or ineffectively treated, exhaust that it otherwise would be releasing while operating to fulfil the drive load at cold start. Fulfilling a vehicle drive load with the electrical drivetrain provides further advantages by creating an opportunity for the ICE to perform alternative functions. As discussed herein, the ICE can be operated at low speeds (e.g., idle) to effectively function as a large air blower, creating airflow directed to the aftertreatment system and the SCR device. The ICE can also perform various operations (e.g., cylinder deactivation (CDA)) to provide heat to the aftertreatment system. Combinations of utilizing the vehicle hybrid powertrain system, in combination with additional methods of regulating heat, including both supply temperature and airflow to the aftertreatment system are discussed in detail herein.

Figure 1:
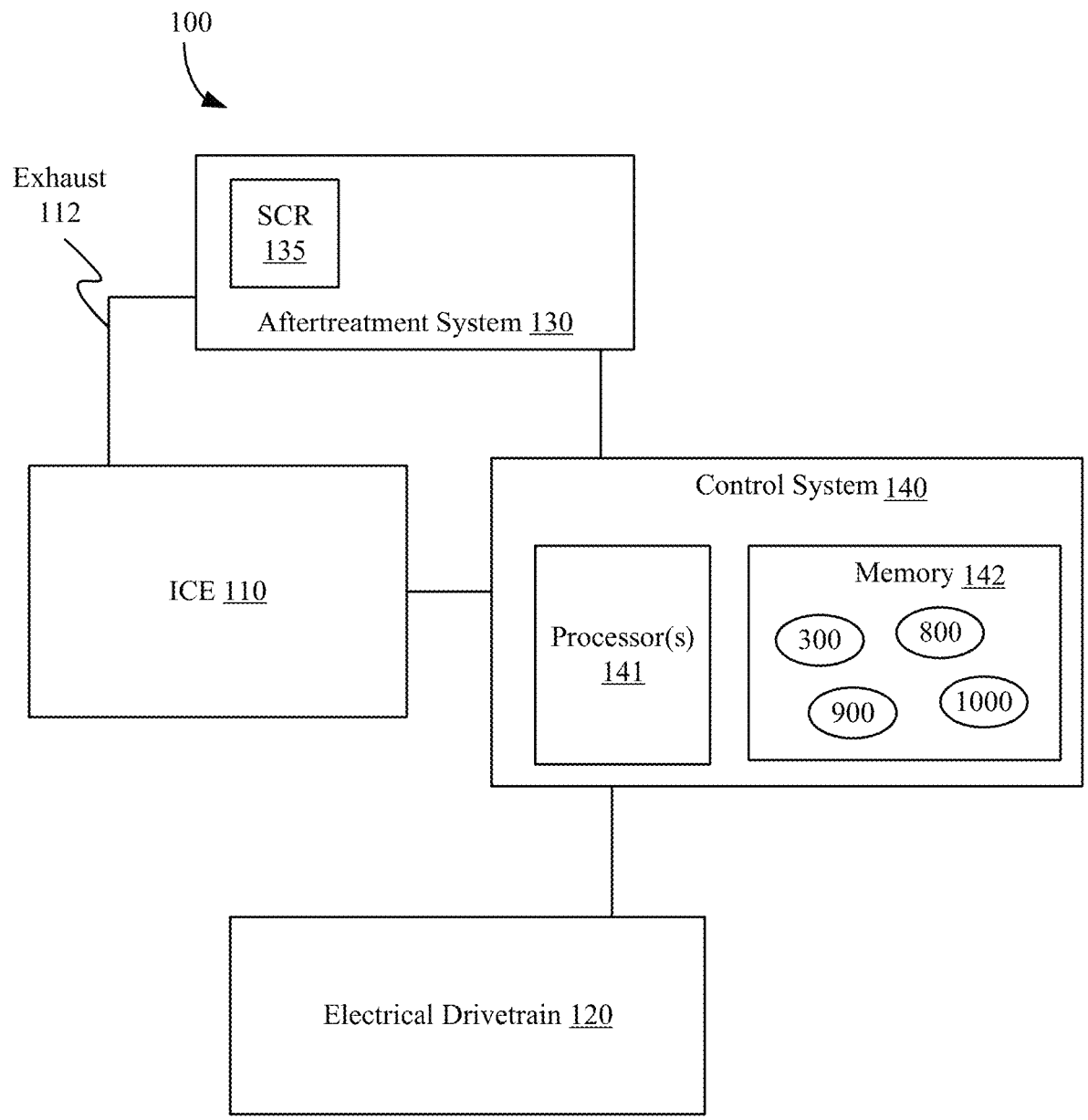
FIG. 1 illustrates a vehicle hybrid powertrain with aftertreatment heat-up control.

FIG. 1 illustrates a vehicle hybrid powertrain with aftertreatment heat-up control. Referring to FIG. 1, the vehicle hybrid powertrain system 100 includes an ICE 110, an electrical drivetrain 120, an aftertreatment system 130 including a SCR device 135, and a control system 140. Here, both the ICE 110 and the electrical drivetrain 120 are able to fulfil a vehicle power load of a vehicle by powering a wheel and axle of the vehicle.

The ICE 110 includes cylinders, intake valves, and exhaust valves (not shown). The electrical drivetrain 120 includes a battery (not shown). In some cases, the electrical drivetrain 120 includes a motor generator (not shown).

Figure 2A:
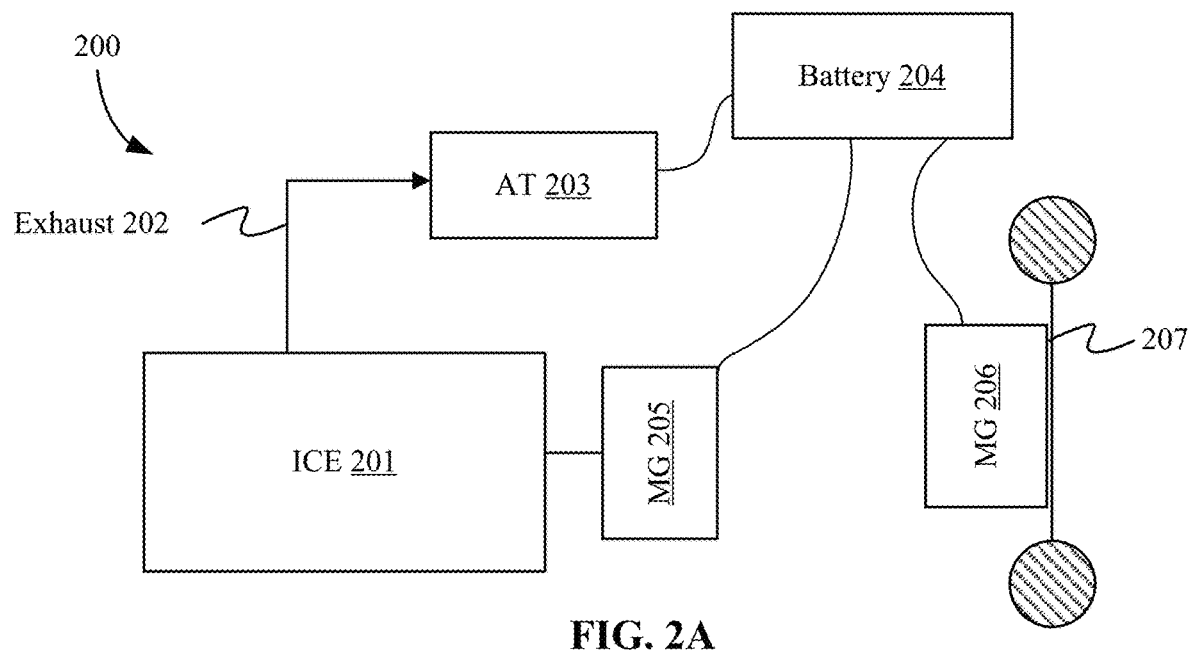
FIGS. 2A-2F illustrate example configurations of vehicle hybrid powertrains.
Figure 2B:
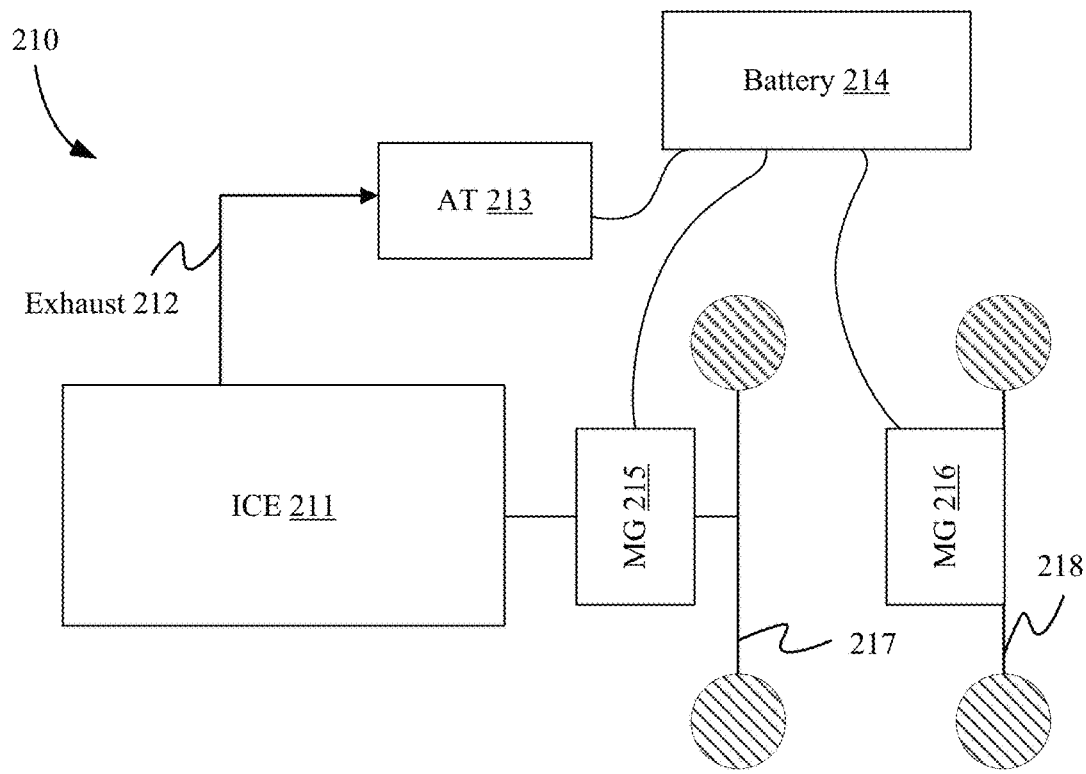
Figure 2C:
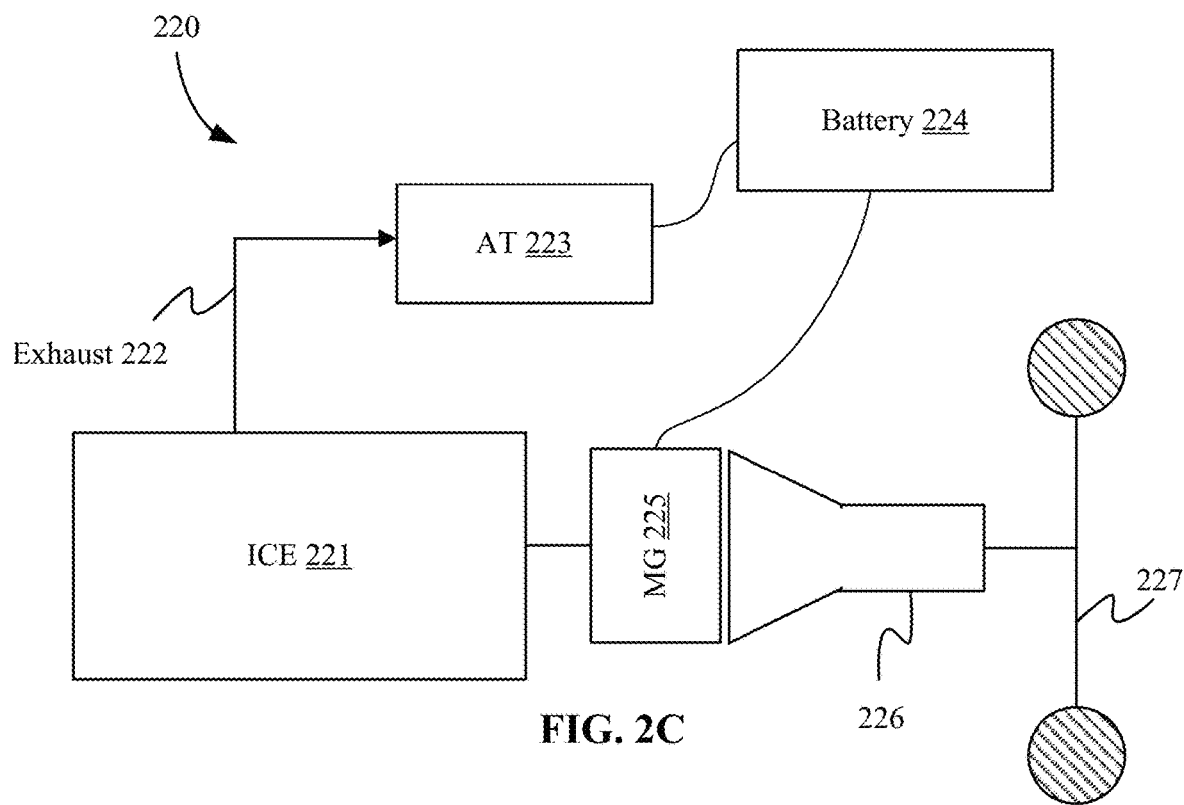
Figure 2D:
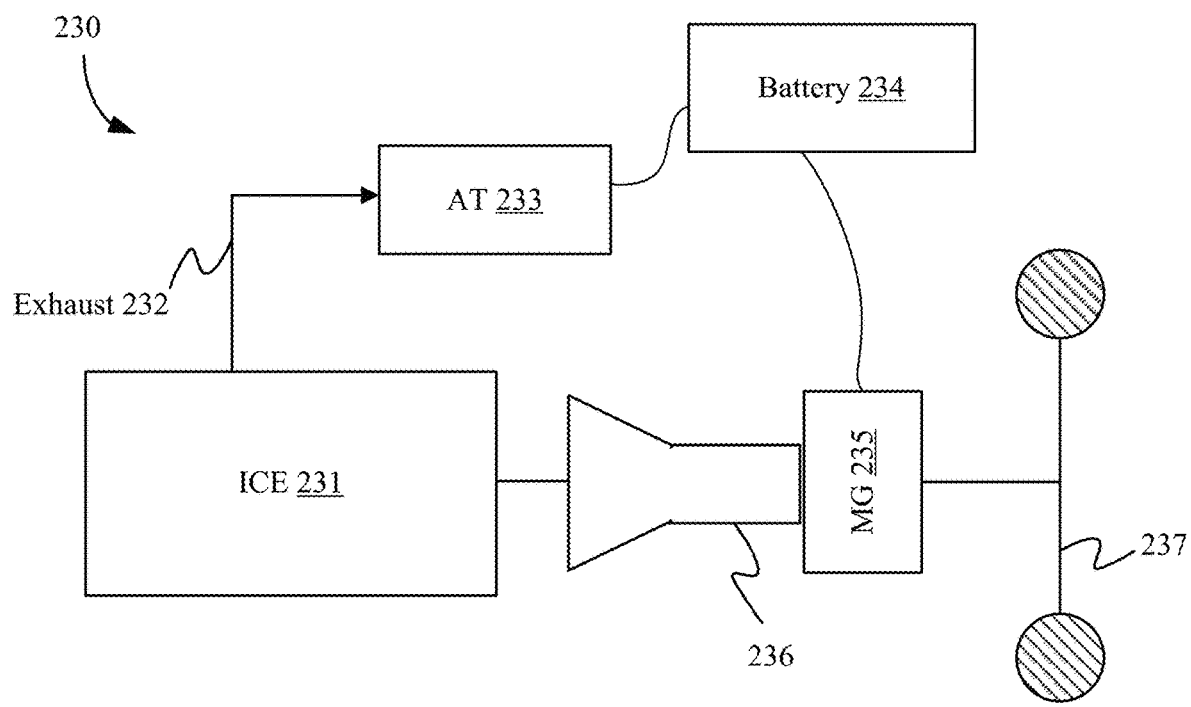
Figure 2E:
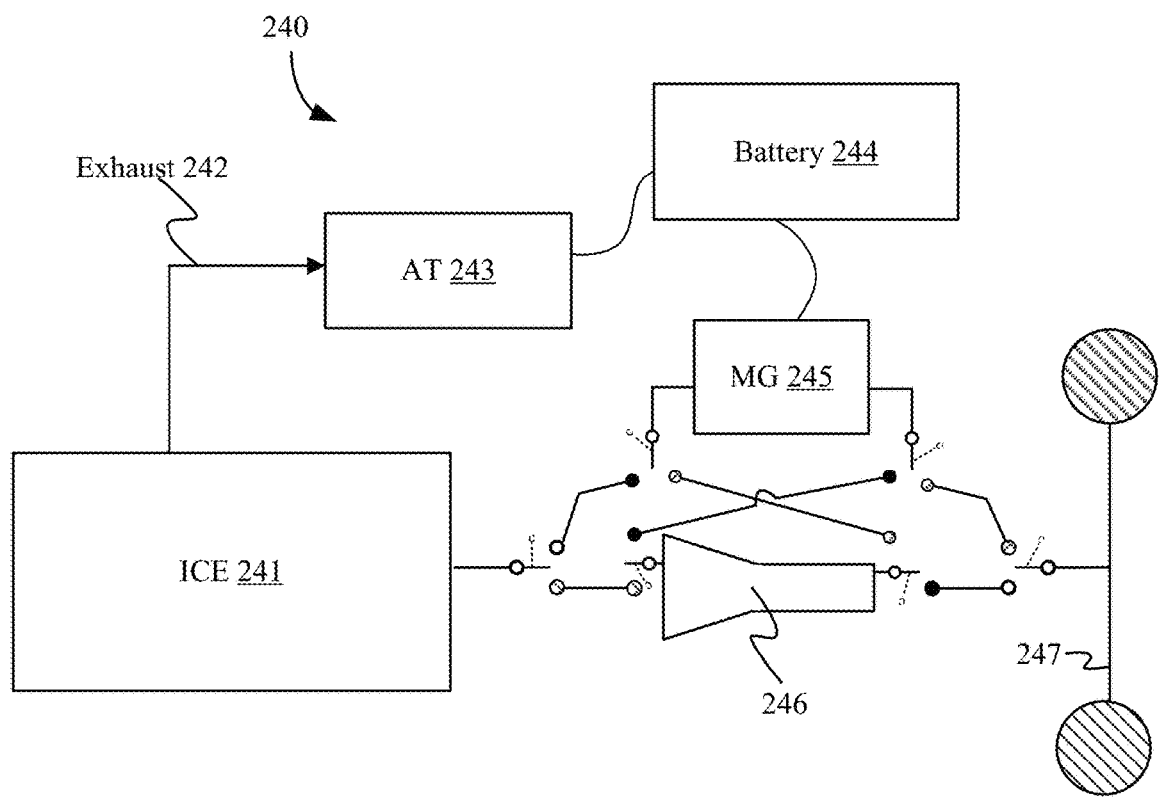
Figure 2F:
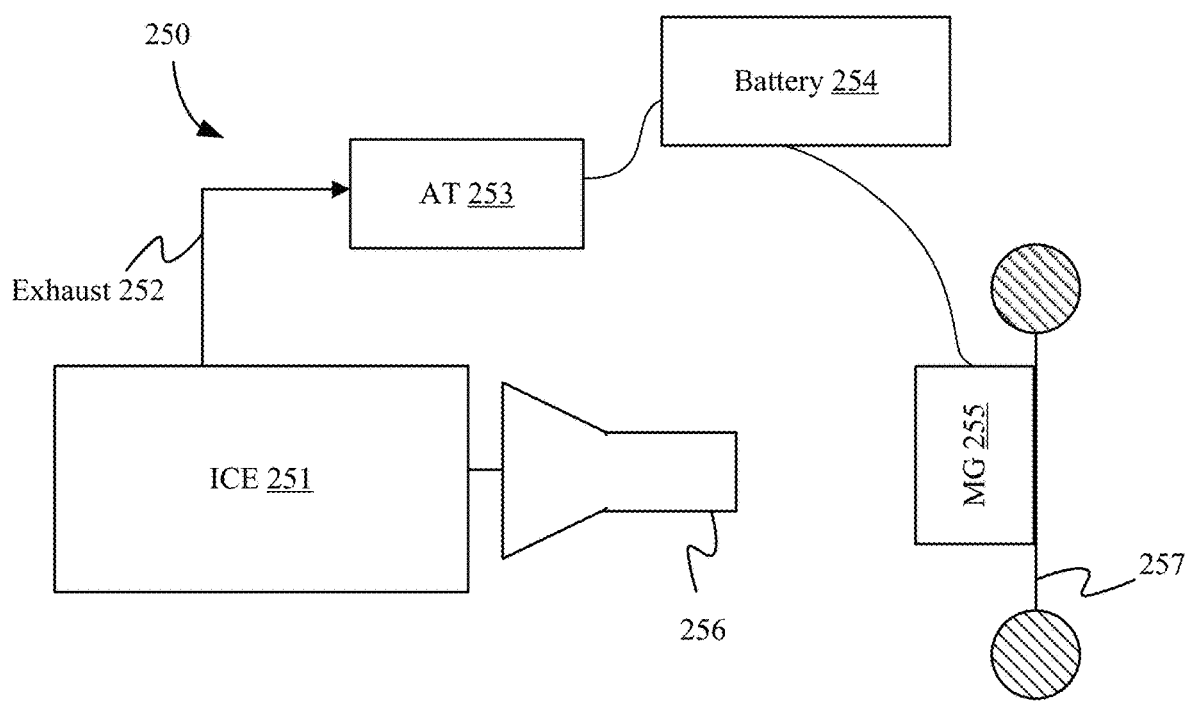

In some cases, the vehicle hybrid powertrain system 100 having the ICE 110 and the electrical drivetrain 120 is in a "series hybrid" configuration as shown in FIG. 2A. In some cases, the vehicle hybrid powertrain system 100 having the ICE 110 and the electrical drivetrain 120 is in a "mixed powertrain" configuration as shown in FIG. 2B. In some cases, the vehicle hybrid powertrain system 100 having the ICE 110 and the electrical drivetrain 120 is in a parallel hybrid "P2" configuration as shown in FIG. 2C. In some cases, the vehicle hybrid powertrain system 100 having the ICE 110 and the electrical drivetrain 120 is in a parallel hybrid "P3" configuration as shown in FIG. 2D. In some cases, the vehicle hybrid powertrain system 100 having the ICE 110 and the electrical drivetrain 120 is in a parallel hybrid "P2/P3 switchable" configuration as shown in FIG. 2E. In some cases, the vehicle hybrid powertrain system 100 having the ICE 110 and the electrical drivetrain 120 is in a "P4" configuration as shown in FIG. 2F.

While operating, the ICE 110 releases exhaust 112 from a tailpipe (not shown). The exhaust 112 is directed to the aftertreatment system 130 for treatment. The aftertreatment system 130 includes a SCR device 135 to treat the $NO_x$ in the exhaust 112. In a preferred embodiment, the ICE 110 is a diesel engine; however, the described techniques are applicable to other ICEs utilizing an aftertreatment system 130 with at least one SCR device 135. In some cases, the SCR device 135 is a primary SCR device. In some cases, the SCR device 135 is a light-off SCR (LO-SCR) device. In some cases, the SCR device 135 is a close-coupled SCR device. In some cases, there are multiple SCR devices in the aftertreatment system, for example, both a LO-SCR and a primary SCR. In some cases, the primary SCR is a single brick. In some cases, the primary SCR includes a plurality of SCR modules in parallel. In some cases, the primary SCR includes a plurality of SCR modules in series. One some or all the SCR devices of the multiple SCR devices can be the focus of the heating strategies described herein.

The aftertreatment system 130 can be implemented in any variety of configurations having at least one SCR device 135 and can include additional filters and components. Non-limiting example configurations are shown in FIGS. 5A-5D and 6A-6F.

The control system 140 directs cylinder deactivation (CDA) of the ICE 110 and controls heat applied to the SCR device 135. In some cases, the control system 140 can further be used to direct which of the ICE 110 and the electrical drivetrain 120 is to be used to fulfil the vehicle drive load. For example, control system 140 can direct the electrical drivetrain 120 to fulfil the vehicle drive load instead of the ICE 110 when the vehicle is operating in a temperature management mode.

CDA is a technique where combinations of cylinders of the ICE 110 are able to be systematically disabled. CDA effectively reduces the ICE's displacement, which can improve efficiency and fuel economy. CDA is achieved by deactivating the intake and exhaust valves of the ICE for the deactivated cylinder. During CDA, injection of fuel to into the cylinder stops. A by-product of deactivating a cylinder is increased temperature at the ICE and, in certain implementations, can be used to supply temperature to the aftertreatment system 130. When used in this manner, the ICE 110 can be considered an exhaust heating device.

The control system 140 can further direct the ICE 110 to operate in idle to generate airflow that transports heat applied to the SCR device 135. Indeed, as described in more detail herein, the ICE 110 can be used to supply both temperature and airflow to the aftertreatment system 130.

Idle refers to operation of the engine in a manner that generally does not result in the ICE being able to move a vehicle. The particular range of speeds considered idle can vary depending on make and model. In some cases, operating the ICE 110 in idle includes operating the ICE 110 between 500-900 RPMs. In some cases, operating the ICE 110 in idle includes operating the ICE 110 between 600-800 RPMs. During idle, the ICE 110 is not providing power to the wheels of the vehicle. In some cases, the idle includes a low-load operation of less than 3 bar BMEP. In a preferred embodiment, the idle includes a low-load operation of less than 1 bar BMEP. For certain accessory loads, the load operation for idle can be less than 0.3 bar BMEP (e.g., accessory loads that may run an air conditioner). In some cases, the ICE 110 is operated where the normal idle speed is at 0 load, up to a 400 RPM delta for elevated idle and a load to up to 3 bar BMEP. In some cases, the ICE 110 is operated at normal idle speed at 0 load, up to a 400 RPM delta with a load up to 1 bar BMEP. In some cases, the ICE 110 is operated where the normal idle speed is at 0 load, up to a 200 RPM delta and a load up to 1 bar BMEP.

The control system 140 can control heat applied to the SCR device 135 by controlling the ICE 110 and/or a separate exhaust heating device (e.g., an electric heater or fuel burner). The control system 140 can receive information from various sensors in the vehicle hybrid powertrain system 100, including temperature information from a location at or near the SCR device 135 as well as information about the status of vehicle components including electrical drivetrain 120 (e.g., battery power status) in order to assist with control processes for applying heat to the SCR device 135. As mentioned above, the control system 140 can activate the CDA and use CDA to apply heat to the SCR device 135. In some cases, the control system 140 directs the ICE 110 to perform CDA as part of the application of heat when the ICE 110 is operating below a 3-bar brake mean effective pressure (BMEP) ICE load.

Figure 4A:
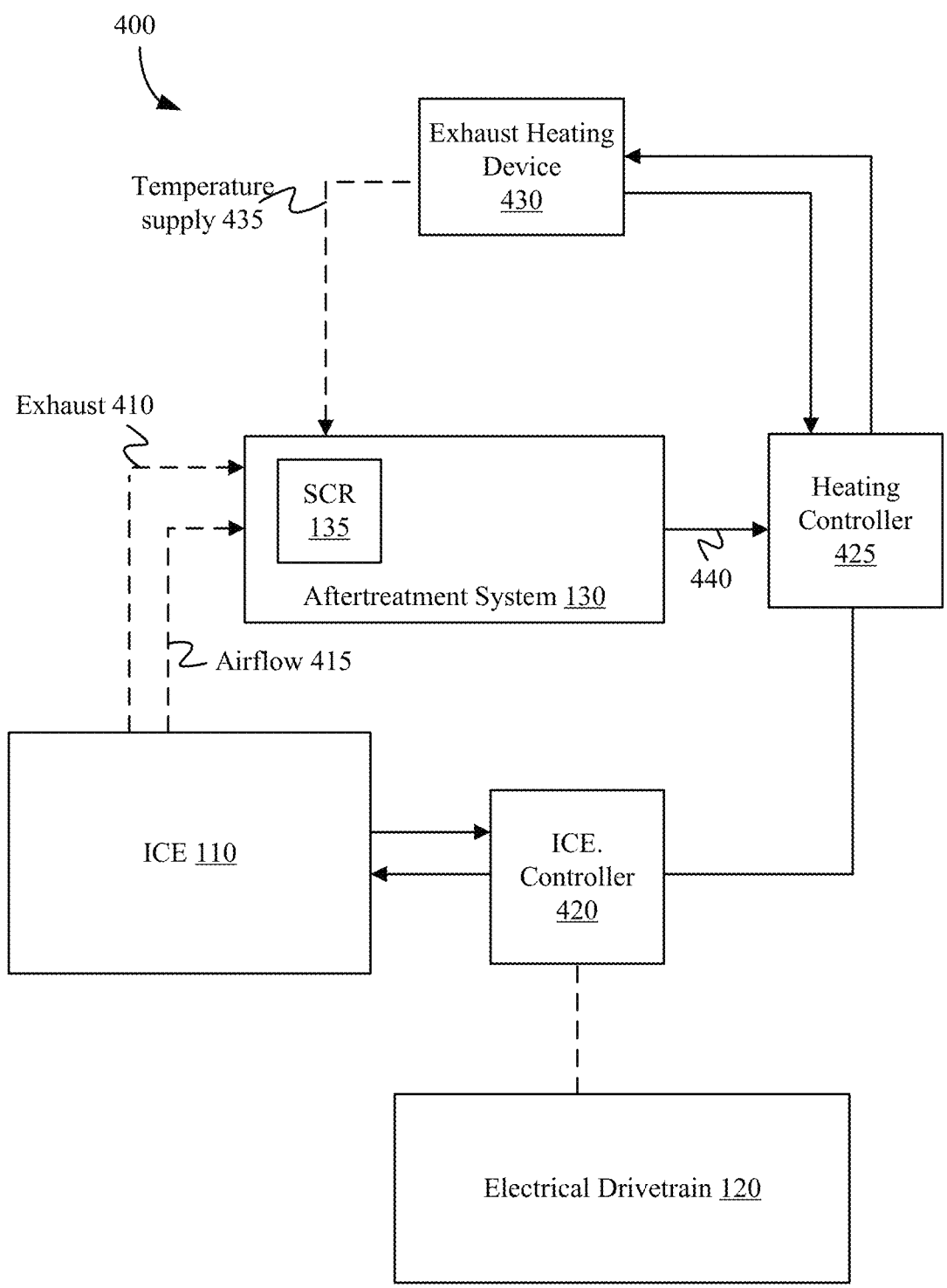
FIG. 4A and FIG. 4B illustrate example vehicle hybrid powertrain systems with aftertreatment heat-up control to increase SCR device $NO_x$ reduction efficiency.

The control system 140 can perform these operations of directing CDA of the ICE 110 and controlling heat applied to the SCR device 135 from a single controller or from separate controllers that may each perform a corresponding operation. For example, the control system 140 can include an ICE controller that includes operations to direct CDA of the ICE 110 and a heating controller that controls a separate exhaust heating device (or devices). An example implementation of such an embodiment is shown in FIG. 4A. Both the ICE controller and the heating controller can be used to supply temperature, where the ICE controller supplies temperature using the CDA technique and the heating controller is used to control one or more separate exhaust heating devices. In some cases, the heating controller can be used to direct the ICE controller to perform the CDA technique as part of a comprehensive temperature management operation. In some cases, the ICE controller includes a temperature management feature that independently directs the performance of the CDA technique as part of an aftertreatment heat up strategy. In some of such cases, vehicle hybrid powertrain system 100 may use just the ICE 110 to supply the temperature (as opposed to also or instead using another exhaust heating device), such as described with respect to the example implementation of FIG. 4B.

For implementations using separate controllers, the separate controllers may be single purpose or may perform other types of control operations for the vehicle. Indeed, one or more of the operations described herein may be integrated in existing controllers of a vehicle as software code and/or hardware modules. That is, the control system 140 can include one or more standalone controllers and/or incorporated in various controllers in or associated with a vehicle.

Accordingly, the control system 140 includes processor(s) 141 and memory 142. The processor(s) 141 can include one or more of any suitable processing devices ("processors"), such as a microprocessor, central processing unit (CPU), field programmable gate arrays (FPGAs), application-specific integrated circuits (ASICs), logic circuits, and state machines. Memory 142 can include any suitable storage media that can store instructions (e.g., to carry out methods of vehicle hybrid powertrain management disclosed herein including method 300 described with respect to FIG. 3, method 800 described with respect to FIG. 8, method 900 described with respect to FIG. 9, and/or method 1000 described with respect to FIG. 10). Example storage media include, but are not limited to, read only memory (ROM), random access memory (RAM), flash, magnetic memory, and the like. As used herein "memory" and "storage media" do not consist of transitory, propagating waves.

FIGS. 2A-2F illustrate example configurations of vehicle hybrid powertrains.

FIG. 2A illustrates a hybrid powertrain system (e.g., hybrid powertrain system 100 of FIG. 1) in a "series hybrid" configuration. The series hybrid powertrain system 200 includes an ICE 201 (e.g., ICE 110 of FIG. 1), an aftertreatment system 203 for treating exhaust 202 from the ICE 201 (e.g., aftertreatment system 130 of FIG. 1), a battery 204, a first motor generator 205, a second motor generator 206, and a wheel and axle 207 (e.g., for a front or rear wheel drive). The transmission is not shown. The first motor generator 205 can be used to spin the ICE 201 without fueling the ICE 201.

The aftertreatment 203 can be electrically coupled to the battery 204 (e.g., when a device requiring power, such as an e-Heater, is located in the aftertreatment 203). In some cases, the aftertreatment system is not electrically coupled to the battery 204. The aftertreatment system 203 can be electrically coupled to the first motor generator 205.

Here, the vehicle drive load (e.g., power to the wheels) is fulfilled by the electric motor (e.g., second motor generator 206) coupled to the wheel and axle 207 using the battery 204 (e.g., electrical drivetrain 120 of FIG. 1) or by the first motor generator 205, which can be run by the ICE 201 (and also used to recharge the battery 204). In this manner, the wheels are solely driven by the electrical drivetrain.

FIG. 2B illustrates the vehicle hybrid powertrain system (e.g., hybrid powertrain system 100 of FIG. 1) in a "mixed powertrain" configuration. The mixed powertrain system 210 includes an ICE 211 (e.g., ICE 110 of FIG. 1), an aftertreatment system 213 for treating exhaust 212 from the ICE 211 (e.g., aftertreatment system 130 of FIG. 1), a battery 214, a first motor generator 215, a second motor generator 216, a first wheel and axle 217, and a second wheel and axle 218. The transmission is not shown. The first motor generator 215 can be used to spin the ICE 211 without fueling the ICE 211.

The aftertreatment 213 can be electrically coupled to the battery 214 (e.g., when a device requiring power, such as an e-Heater, is located in the aftertreatment 213). In some cases, the aftertreatment system is not electrically coupled to the battery 214. The aftertreatment system 213 can be electrically coupled to the first motor generator 215.

Here, the vehicle drive load (e.g., power to the wheels) can be operated as front wheel drive, rear wheel drive, or all-wheel drive. The power to the second wheel and axle 218 can operate similar to the series hybrid where the second motor generator 216 operates the second wheel and axle 218 using the battery 214 (e.g., electrical drivetrain 120 of FIG. 1) or by the first motor generator 215 (which can also recharge the battery 214). However, in the mixed powertrain configuration, the first motor generator 215, which can be run by the ICE 211 (or the battery 214), can directly drive the first wheel and axle 217.

Accordingly, the vehicle hybrid powertrain system 210 in mixed powertrain configuration can be driven (1) on the first wheel and axle 217 via power supplied by the ICE 211 and/or (2) electrically on the second wheel and axle 218 via power supplied by the electrical drivetrain.

FIG. 2C illustrates the vehicle hybrid powertrain system (e.g., hybrid powertrain system 100 of FIG. 1) in a parallel hybrid "P2" configuration. The parallel hybrid powertrain system 220 includes an ICE 221 (e.g., ICE 110 of FIG. 1), an aftertreatment system 223 for treating exhaust 222 from the ICE 221 (e.g., aftertreatment system 130 of FIG. 1), a battery 224, a motor generator 225, a hybrid transmission 226, and a wheel and axle 227. In the P2 configuration, the motor generator 225 is in front of the hybrid transmission 226 (for example by being side attached to the transmission using a belt or integrated in the transmission using a gear mesh). The first motor generator 225 can be used to spin the ICE 221 without fueling the ICE 221.

The aftertreatment 223 can be electrically coupled to the battery 224 (e.g., when a device requiring power, such as an e-Heater, is located in the aftertreatment 223). In some cases, the aftertreatment system is not electrically coupled to the battery 224. The aftertreatment system 223 can be electrically coupled to the first motor generator 225.

Here, the ICE 221 and the battery 224 can both drive the wheel and axle 227 through the motor generator 225. The hybrid transmission 226 can use either the electrical drive train (e.g., via battery 224) or the ICE 221 to fulfil the vehicle drive load.

FIG. 2D illustrates a vehicle hybrid powertrain system (e.g., hybrid powertrain system 100 of FIG. 1) in a parallel hybrid "P3" configuration. The parallel hybrid powertrain system 230 includes an ICE 231 (e.g., ICE 110 of FIG. 1), an aftertreatment system 233 (e.g., aftertreatment system 130 of FIG. 1) for treating exhaust 232 from the ICE 231, a battery 234, a motor generator 235, a hybrid transmission 236, and a wheel and axle 237. The hybrid transmission 236 and/or the motor generator 235 can be used to spin the ICE 231 without fueling the ICE 231.

The aftertreatment 233 can be electrically coupled to the battery 234 (e.g., when a device requiring power, such as an e-Heater, is located in the aftertreatment 233). In some cases, the aftertreatment system is not electrically coupled to the battery 234. The aftertreatment system 233 can be electrically coupled to the first motor generator 235.

In the P3 configuration of the parallel hybrid powertrain system 230, the motor generator 235 is connected at the back of the hybrid transmission 236 such that the hybrid transmission 236 is between the ICE 231 and the motor generator 235 (for example by being attached on the hybrid transmission 236 on the output shaft).

FIG. 2E illustrates a vehicle hybrid powertrain system (e.g., hybrid powertrain system 100 of FIG. 1) in a "P2/P3 switchable" configuration. The switchable parallel hybrid powertrain system 240 includes an ICE 241 (e.g., ICE 110 of FIG. 1), an aftertreatment system 243 (e.g., aftertreatment system 130 of FIG. 1) for treating exhaust 242 from the ICE 241, a battery 244, a motor generator 245, a hybrid transmission 246, and a wheel and axle 247. The hybrid transmission 246 and/or the motor generator 245 can be used to spin the ICE 241 without fueling the ICE 241.

The aftertreatment 243 can be electrically coupled to the battery 244 (e.g., when a device requiring power, such as an e-Heater, is located in the aftertreatment 243). In some cases, the aftertreatment system is not electrically coupled to the battery 244. The aftertreatment system 243 can be electrically coupled to the first motor generator 245.

In the P2/P3 switchable configuration of the parallel hybrid powertrain system 240, the motor generator 245 connection to the hybrid transmission 246 is switchable between P2 and P3 configurations. Therefore, the motor generator 245 can either be connected in the P2 configuration (i.e., in front of the hybrid transmission 246) or in the P3 configuration (i.e., at the back of the hybrid transmission 246).

FIG. 2F illustrates a vehicle hybrid powertrain system (e.g., hybrid powertrain system 100 of FIG. 1) in a parallel hybrid "P4" configuration. The parallel hybrid powertrain system 250 includes an ICE 251, an aftertreatment system 253 for treating exhaust 252 from the ICE 251, a battery 254, a motor generator 255, a hybrid transmission 256, and a wheel and axle 257. The hybrid transmission 256 can be used to spin the ICE 251 without fueling the ICE 251. In the P4 configuration of the parallel hybrid powertrain system 250, the motor generator 255 is positioned on the wheel and axle 257 (for example on the rear axle drive or wheel hubs). The aftertreatment 253 can be electrically coupled to the battery 254 (e.g., when a device requiring power, such as an e-Heater, is located in the aftertreatment 253). In some cases, the aftertreatment system is not electrically coupled to the battery 254.

Figure 3:
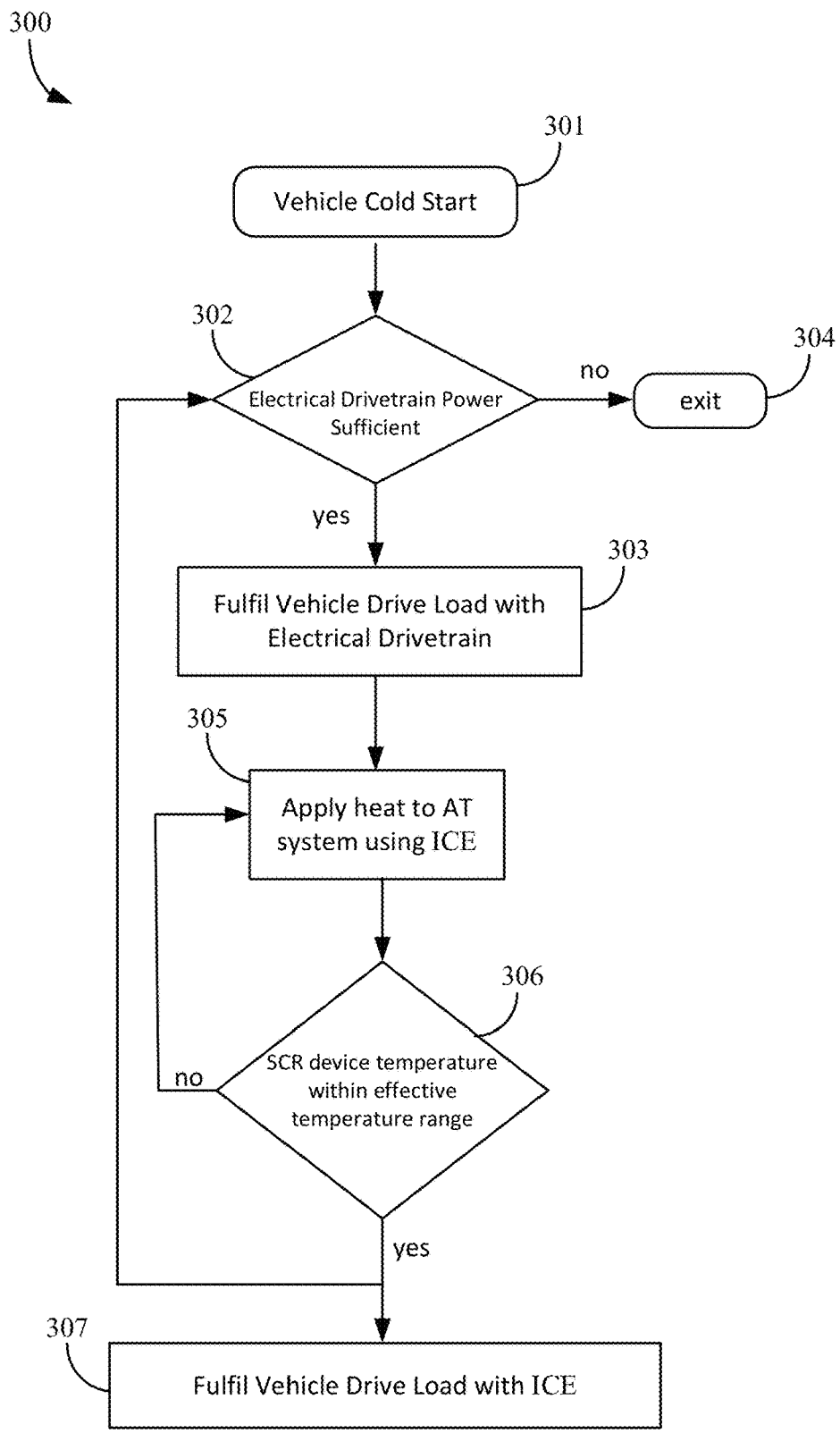
FIG. 3 illustrates an example process flow of a method for operating a vehicle hybrid powertrain in cold start to increase SCR device $NO_x$ reduction efficiency.

FIG. 3 illustrates an example process flow of a method for operating a vehicle hybrid powertrain in cold start to increase SCR device $NO_x$ reduction efficiency. The method 300 begins when a vehicle with a vehicle hybrid powertrain (e.g., vehicle hybrid powertrain system 100 of FIG. 1) is at a cold start (301). A control system, such as control system 140 of FIG. 1, can carry out the method 300.

When a vehicle is in cold start (301), the control system can, in some cases, determine (302) whether an electrical drivetrain (e.g., electrical drivetrain 120 of FIG. 1) of the vehicle hybrid powertrain has sufficient power (e.g., battery charge) to fulfil a vehicle drive load. For example, the control system may receive battery power status information of the electrical drivetrain and compare the battery power status information to a threshold value indicating that the battery/electrical drivetrain has sufficient power. The battery power status information may indicate the current charge status of a battery in the electrical drivetrain. In some cases, the battery power status information specifies a charge percentage of the battery's power (e.g., the battery is at 50% charge). If the control system determines that the electrical drivetrain has sufficient battery charge to fulfil the vehicle drive load during operation 302, the control system directs (303) the electrical drivetrain to fulfil the vehicle drive load. If the control system determines that the electrical drivetrain does not have sufficient battery charge to fulfil the vehicle drive load during operation 302, the control system may exit (304) the aftertreatment heat up strategy or enter a different mode of operation for aftertreatment heat up (either of which may include operating the ICE to fulfil the vehicle drive load). In some cases, operation 302 is omitted and the electrical drivetrain is always selected to be operated during cold start.

While the vehicle drive load is fulfilled by the electrical drivetrain initiated in operation 303, the control system directs the vehicle hybrid system to apply heat (305) to an aftertreatment system (e.g., aftertreatment system 130 of FIG. 1) using the ICE (e.g., ICE 110 of FIG. 1) in order to heat up a SCR device of the aftertreatment system. In some cases, applying (305) the heat to the aftertreatment system includes performing CDA at the ICE while the ICE is not fulfilling the vehicle drive load. In some cases, applying (305) the heat to the aftertreatment system includes using the ICE and one or more external exhaust heating devices. In some cases, applying (305) the heat to the aftertreatment system includes using method 800 of FIG. 8, using method 900 of FIG. 9, using method 1000 of FIG. 10, or a combination thereof.

Method 300 further includes determining (306) whether the SCR device of the aftertreatment system (e.g., SCR device 135 of FIG. 1) is within an effective temperature range (e.g., for $NO_x$ reduction). In some cases, the effective temperature range is in a range of 250° C.-450° C. In some cases, the effective temperature range is in a range of 200° C.-450° C. The effective temperature range can be a range within either of these identified ranges and may even change, depending on factors including SCR device materials/configuration and heating strategy (e.g., two-tier heating such as described with respect to FIG. 8). When the SCR device is determined in operation 306 to be within an effective temperature range, the control system can direct (307) the ICE to fulfil the vehicle drive load. In some cases, the electrical drivetrain may continue to be used to fulfil the vehicle drive load until some other condition is satisfied (e.g., such as for fuel efficiency or driver selection) before enabling the ICE to fulfil the vehicle drive load.

By operating the electrical drivetrain during conditions that are not optimal for operating the SCR device it is possible to ensure that $NO_x$ is treated by the SCR device most effectively to optimize emission reduction.

Figure 4B:
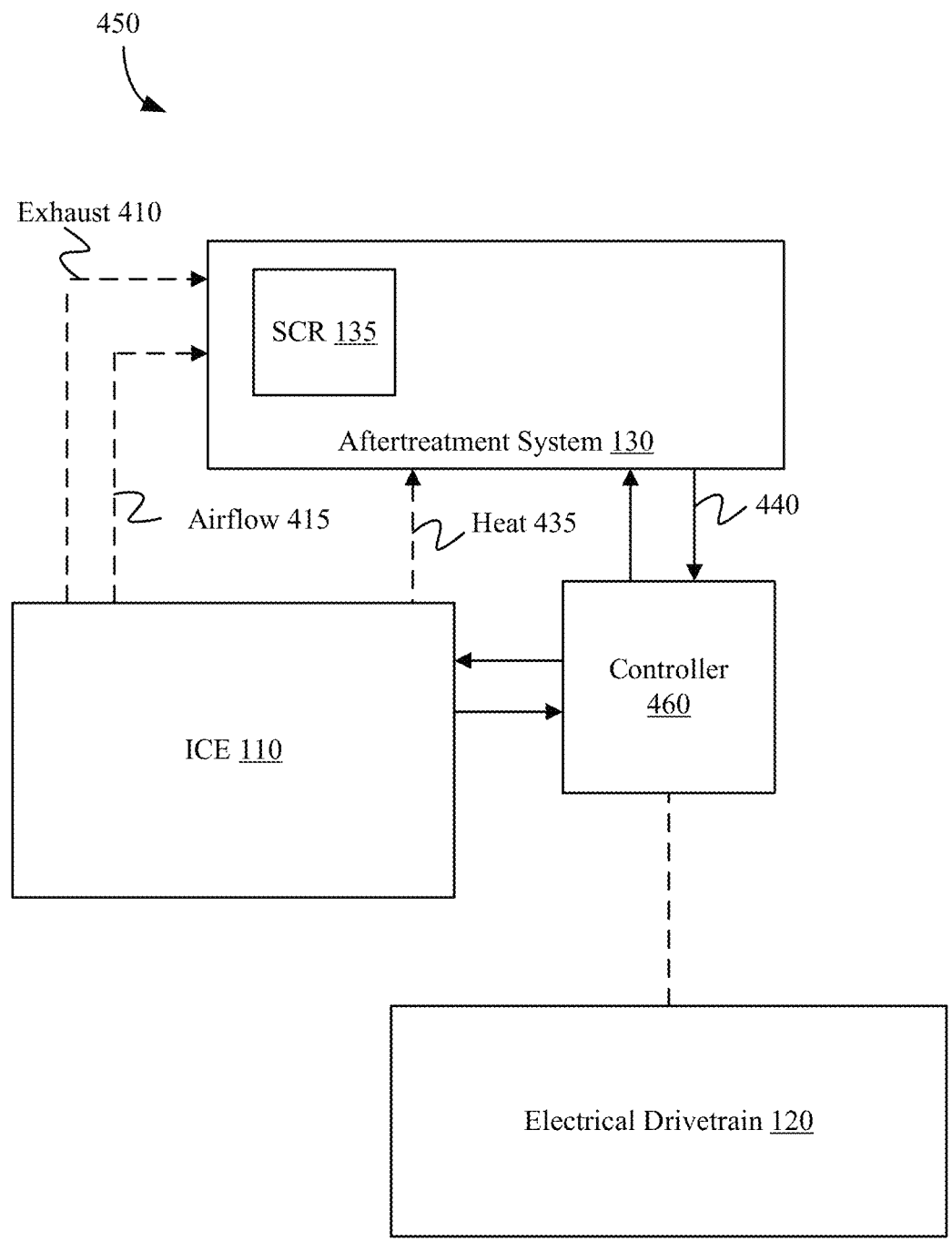

FIGS. 4A and 4B illustrate example vehicle hybrid powertrain systems with aftertreatment heat-up control to increase SCR device $NO_x$ reduction efficiency.

Referring to FIG. 4A, the vehicle hybrid powertrain system 400 includes the ICE 110, the aftertreatment system 130 including the SCR device 135, and the electrical drivetrain 120 such as described with respect to the hybrid powertrain system 100 of FIG. 1. In the example shown in FIG. 4A, the vehicle hybrid powertrain system 400 includes a control system with an ICE controller 420 and a heating controller 425. Here at least one exhaust heating device 430 is included to supply the temperature. The aftertreatment system 130 and exhaust heating device 430 configurations can include, but are not limited to, those shown in FIGS. 5C, 5D, and 6A-6F.

The ICE controller 420 can direct the ICE 110 to fulfil the drive load of a vehicle in accordance with any of the hybrid configurations described herein or available in the future.

When operating, the ICE 110 releases exhaust 410 from a tailpipe (not shown). The exhaust 410 includes several pollutants regulated worldwide, including $NO_x$ and $CO_2$. The aftertreatment system 130 is coupled to the ICE such that the exhaust 410 released by the ICE 110 is directed to the aftertreatment system 130. As regulations on the emissions from exhaust 410 tighten, more effective methods of treating the exhaust 410 are required.

To achieve highly effective exhaust 410 treatment, the SCR device 135 is preferably heated to a temperature within an effective temperature range (i.e., the temperature range for effective $NO_x$ reduction) as quickly as possible. Here, the ICE controller 420 and the heating controller 425 are used to apply heat, for example by generating airflow 415 from the ICE 110 and supplying temperature 435 from the exhaust heating device 430.

Advantageously, the vehicle hybrid powertrain system 400 can use the electrical drivetrain 120 to fulfil the drive load of the vehicle by powering a wheel and axle of the vehicle (not shown) of the vehicle while still using the ICE 110 for other purposes, including heating the SCR device 135 (e.g., by at least providing airflow).

While the drive load of the vehicle is fulfilled by the electrical drivetrain 120, the ICE 110 releases very low, to no, exhaust 410 (depending on current ICE 110 operation). Fulfilling the vehicle drive load with the electrical drivetrain 120 reduces emissions of the vehicle while the SCR device is at lower temperatures, where the drive load would otherwise be fulfilled by the ICE 110 releasing inadequately treated exhaust 410. The vehicle hybrid powertrain system 400 maximizes SCR device 135 $NO_x$ reduction efficiency without restricting user access to standard vehicle operation while the SCR device 135 is at cooler temperatures. Indeed, while the vehicle drive load is supported by the electrical drivetrain 120, the ICE 110 can be utilized for aftertreatment temperature control strategies.

For the implementations described herein, the ICE controller 420 includes appropriate instructions stored thereon to enable the ICE controller 420 to direct CDA of the ICE 110. The ICE controller 420 can receive a variety of signals from the vehicle (such as via sensors and other components). In some cases, the ICE controller 420 receives ICE speed information of the ICE 110. ICE speed information may be used to perform speed density equations and/or be used to provide results of speed density equations performed elsewhere (as may be used to determine ICE control signals).

The heating controller 425 controls the exhaust heating device 430. The heating controller 425 can receive temperature information 440 of the aftertreatment system 130 from temperature sensors (not shown) located in the aftertreatment system 130. Example sensor locations for certain configurations can be seen in FIGS. 6A-6F. The heating controller 425 can also receive the ICE speed information. In some cases, the heating controller 425 receives information from the ICE 110 (or ICE controller 420). In some cases, the heating controller 425 receives exhaust mass flowrate information from sensors in the aftertreatment system 130. The heating controller 425 can direct the exhaust heating device 430 to supply temperature 435 to the aftertreatment system 130 in accordance with certain heating strategies including method 300 described with respect to FIG. 3 and method 800 described with respect to FIG. 8.

For example, the exhaust heating device 430 can supply temperature 435 at setpoint locations in the aftertreatment system 130. There are several locations in the aftertreatment system that would be a suitable setpoint location, including, but not limited to, at the SCR device mid-bed (LO-SCR or primary SCR), at the SCR average (Avg.) (LO-SCR or primary SCR), at a diesel particulate filter (DPF) outlet, and at a diesel oxidation catalyst (DOC) outlet. In some cases, the exhaust heating device 430 is an electric heater (e-Heater). In some cases, the exhaust heating device 430 is a fuel burner. The ICE 110 can provide airflow 415 under control of the ICE controller 420 and optionally also the heating controller 425. In some cases, the ICE 110 further provides a supply of temperature by performing CDA. In some cases, the heating controller 425 directs the ICE controller 420 to control ICE 110 to perform the CDA and/or operate at certain speeds. In some cases, the heating controller 425 and the ICE controller 420 are part of the same controller.

As mentioned above, the ICE 110 can provide the airflow 415 to heat the SCR device. While the electrical drivetrain 120 is supporting the drive load or even while the vehicle drive load remains unfulfilled (i.e., the vehicle is not moving), the ICE 110 can operate in idle (e.g., idle or elevated idle).

While the ICE 110 is in idle, the ICE 110 acts as a large air blower, moving air downstream the aftertreatment system 130. Advantageously, using the ICE 110 in idle eliminates the need for an additional component (e.g., external blower) to provide the required airflow 415 to the aftertreatment system 130.

In some cases, the ICE 110 can provide heat to the aftertreatment system 130 while in a "thermal management mode". The thermal management mode can be used to temporarily operate the ICE in a fuel-inefficient way to elevate exhaust gas temperature. Example thermal management mode operations include turbine bypass, early electronic exhaust valve opening, elevated EGR at low loads, additional fuelling, etc.). The thermal management mode can also be available for internal combustion engines that do not have CDA capabilities to provide a mechanism to apply heat using the ICE.

Figure 7:
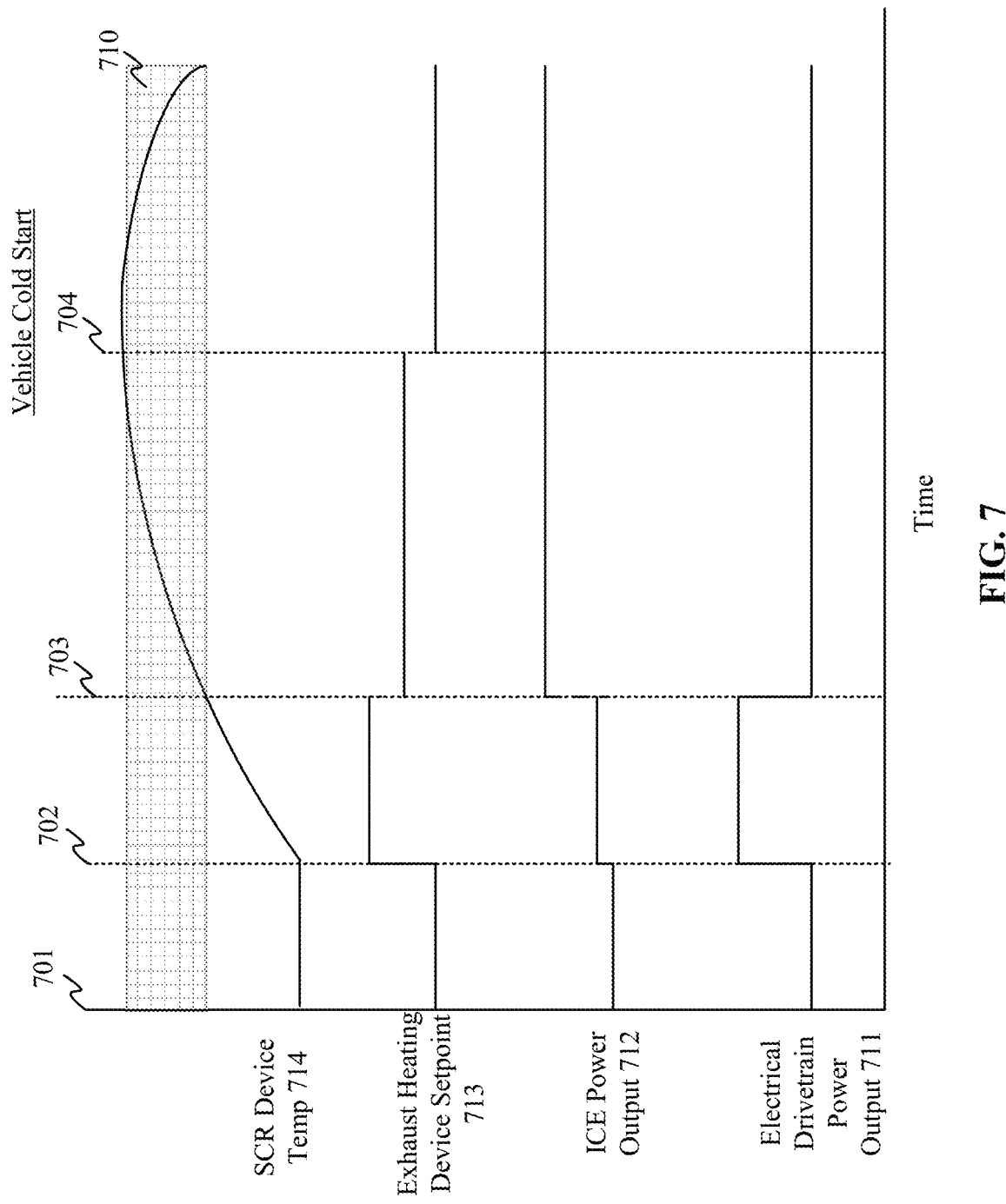
FIG. 7 illustrates a timing diagram for an example operation from cold start.

When the vehicle's drive load is supported by the electrical drivetrain 120, the vehicle can still drive normally while simultaneously using the ICE 110 as an air blower. Example methods are described with respect to FIGS. 9 and 10. These operations maintain low emission rates, because while the ICE 110 is in idle, the emissions contain minimal $NO_x$ content (less than 10 mg $NO_x$/hp-hr). This keeps the emissions total low while the aftertreatment system 130 is being heated to efficient temperatures to treat the exhaust 410 from the ICE 110 (when the ICE 110 is used to support the vehicle drive load instead of or with the electrical drivetrain 120. This hybrid functionality of the hybrid powertrain system 100 is favorable when the vehicle is in cold start. An example operation of vehicle hybrid powertrain system 400 in cold start is shown in FIG. 7.

Figure 5A:
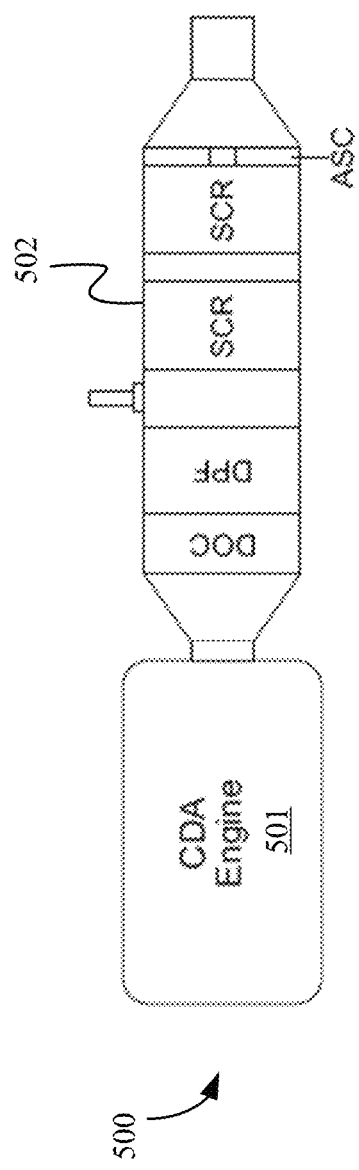
FIGS. 5A-5D illustrate example internal combustion engine and aftertreatment configurations.
Figure 5B:
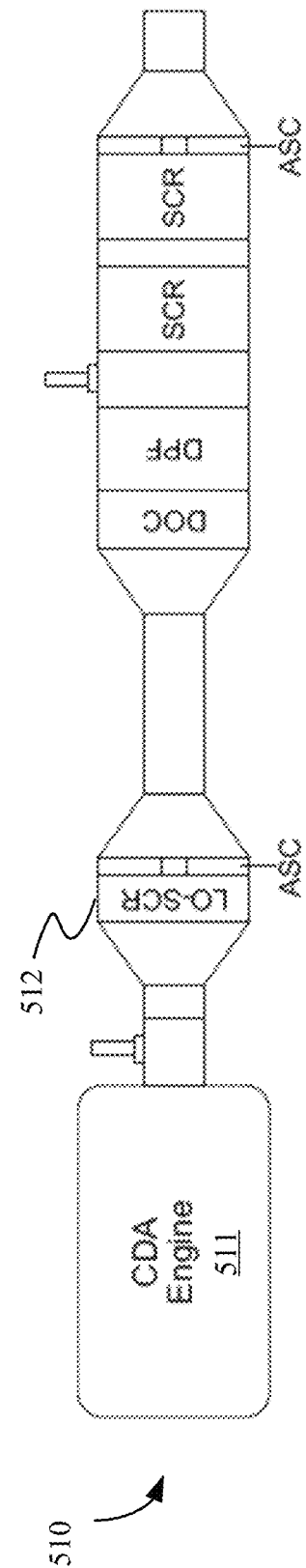

As mentioned above, the ICE 110 can be used to apply heat while the electrical drivetrain 120 is supporting the vehicle drive load. In some of such implementations, a separate exhaust heating device can be omitted (e.g., where aftertreatment system 130 is configured such as illustrated in FIG. 5A-5B, where there is no separate exhaust heating device) and/or not used. Referring to FIG. 4B, a vehicle hybrid powertrain system 450 can be implemented where the ICE 110 performs as an exhaust heating device under the control of controller 460, which controls heat 435 applied to the aftertreatment system 130 and controls CDA of the ICE 110 based on temperature information 440 of the aftertreatment system and ICE information (e.g., speed, temperature, etc.) of the ICE 110. In some cases, controller 460 performs method 900 of FIG. 9 or method 1000 of FIG. 10. In some cases, controller 460 can apply a two-tier temperature approach such as described with respect to method 800 of FIG. 8 (and also shown in the process illustrated in FIG. 7) using the CDA technique to generate temperature set points. As with the vehicle hybrid powertrain system 400, the hybrid configuration can be, but is not limited to, any of the configurations shown in FIGS. 2A-2F.

FIGS. 5A-5D illustrate example ICE and aftertreatment configurations. The configurations shown in FIGS. 5A-5D utilize a CDA-enabled ICE (e.g., "CDA engine").

Referring to FIG. 5A, configuration 500 includes a CDA engine 501 and a primary SCR device 502. The primary SCR device 502 is located downstream from the CDA engine 501. In this configuration, there is no separate exhaust heating device. Instead, the primary SCR device 502 is heated by application of the CDA technique by the CDA engine 501. During certain experiments utilizing an implementation of method 800 described with respect to FIG. 8, $NO_x$ released at tailpipe was dropped to 0.50 g/hp-hr (projected) and $CO_2$ reduction was also achieved.

Figure 5C:
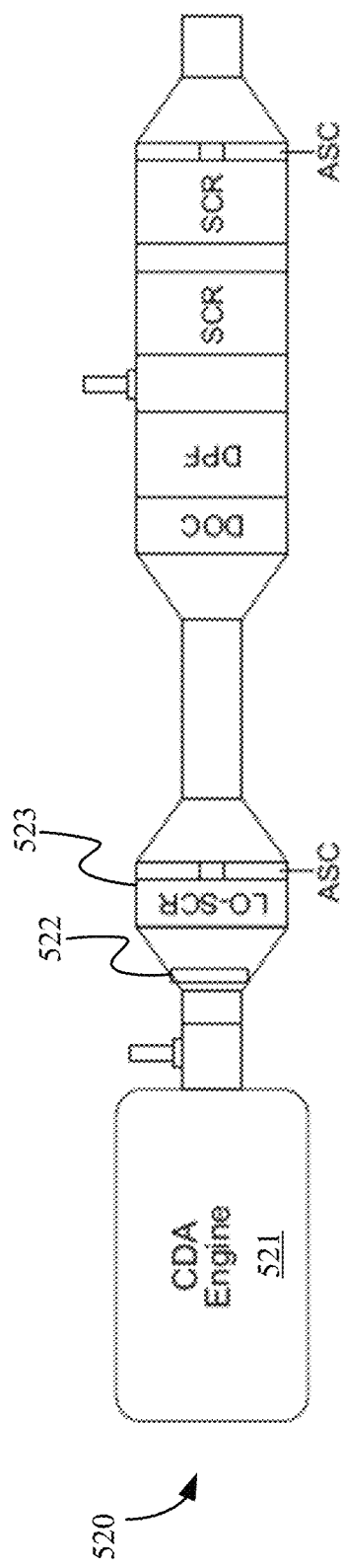
Figure 5D:
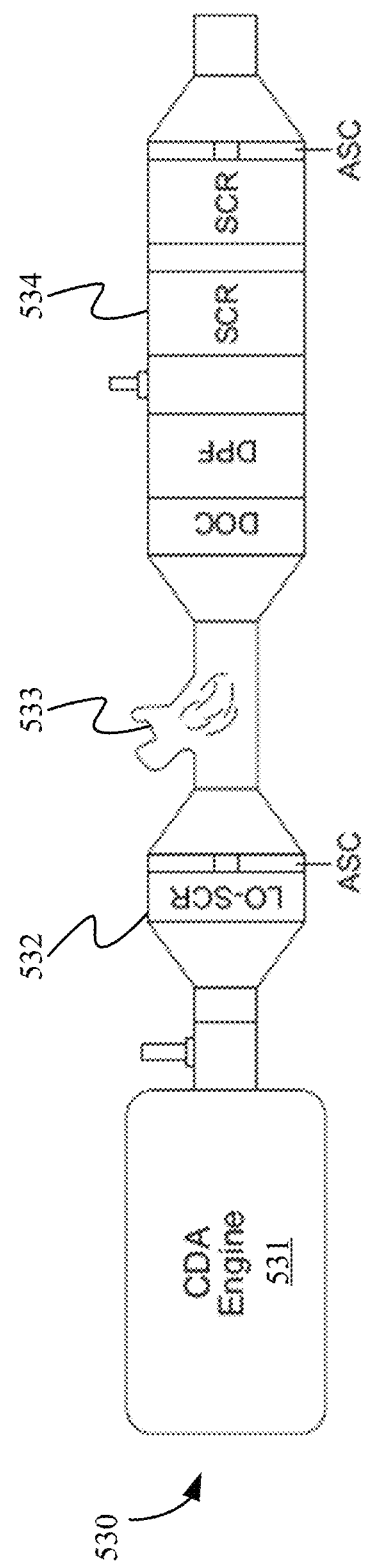

The configurations shown in FIGS. 5B-5D utilize both the CDA engine and a light-off SCR (LO-SCR) device in the aftertreatment system. The aftertreatment system in accordance with the examples shown in FIGS. 5B-5D can thus include both a LO-SCR and a primary SCR (which may be one or more SCR devices downstream a DPF and/or DOC), where the LO-SCR is an upstream SCR device that is located proximate to and downstream from the CDA engine. Advantageously, by being positioned closer to the exhaust inlet of the aftertreatment system without other dense filters (e.g., DPF and/or DOC) before it, the LO-SCR can heat up much faster than the primary SCR device and therefore improve $NO_x$ reduction efficiency from cold start. FIGS. 5C and 5D further include a separate (from the ICE) exhaust heating device.

Referring to FIG. 5B, configuration 510 includes a CDA engine 511 and a LO-SCR device 512. The LO-SCR device 512 is located downstream from the CDA engine 511. In this configuration, there is no separate exhaust heating device. Instead, the LO-SCR device 512 is heated by application of the CDA technique by the CDA engine 511. During certain experiments utilizing an implementation of method 800 described with respect to FIG. 8, $NO_x$ released at tailpipe was dropped to between 0.014 and 0.018 g/hp-hr and $CO_2$ reduction was also achieved.

Referring to FIG. 5C configuration 520 includes a CDA engine 521, an e-Heater 522, and a LO-SCR device 523. The e-Heater 522 is positioned between the CDA engine 521 and the LO-SCR 523 to supply temperature to heat the LO-SCR. In configuration 520, the CDA engine 521 can be used to supply the airflow for the temperature supplied by the e-Heater 522 and can also provide additional heat through application of the CDA technique. Thus, the e-Heater 522 can be a smaller heater, for example, in one non-limiting implementation, the e-Heater 522 is a 2.4 kW e-Heater. During certain experiments utilizing an implementation of method 800 described with respect to FIG. 8, $NO_x$ released at tailpipe was dropped to about 0.012 g/hp-hr and $CO_2$ reduction was also achieved.

Referring to FIG. 5D, configuration 530 includes a CDA engine 531, a LO-SCR device 532, and a fuel burner 533. The LO-SCR device 532 is located downstream from the CDA engine 531 and is heated by application of the CDA technique by the CDA engine 531. The fuel burner 533 is located downstream from the LO-SCR device 532 and used to supply temperature to heat the primary SCR 534. Again, the CDA engine 531 can supply the airflow for applying heat to the primary SCR 534 (and the LO-SCR device 532). During certain experiments utilizing an implementation of method 800 described with respect to FIG. 8 (and a 50/20 kW fuel burner), $NO_x$ released at tailpipe was dropped to about 0.012 g/hp-hr.

FIGS. 6A-6F illustrate examples of compatible aftertreatment heating configurations. Configurations 1-6, which correspond to FIGS. 6A-6F, are working examples of aftertreatment systems (e.g., aftertreatment system 130 of FIG. 1). Configurations 1-6 illustrate non-limiting configurations of aftertreatment systems and aftertreatment systems may include any combination of the parts described below. In addition, although the primary SCR is shown as a plurality of SCR modules in series, implementations of the illustrated configurations can use other configurations of the primary SCR.

Figure 6A:
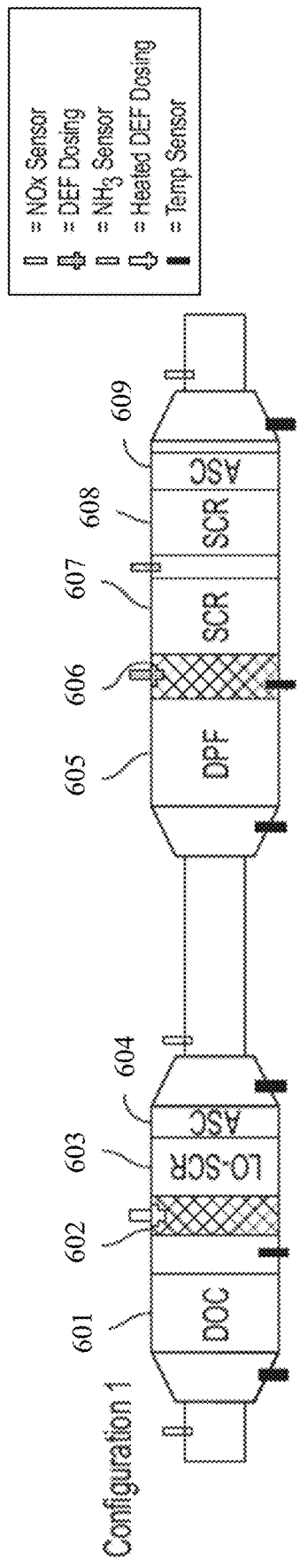
FIGS. 6A-6F illustrate additional example implementations of aftertreatment systems.

Referring to FIG. 6A, Configuration 1 includes, for an output of an ICE (e.g., ICE 110 of FIG. 1), a DOC 601, a first e-Heater 602, a LO-SCR 603, a first ammonia slip catalyst (ASC) 604, a DPF 605, a second e-Heater 606, a first SCR 607, a second SCR 608, and a second ASC 609.

Figure 6B:
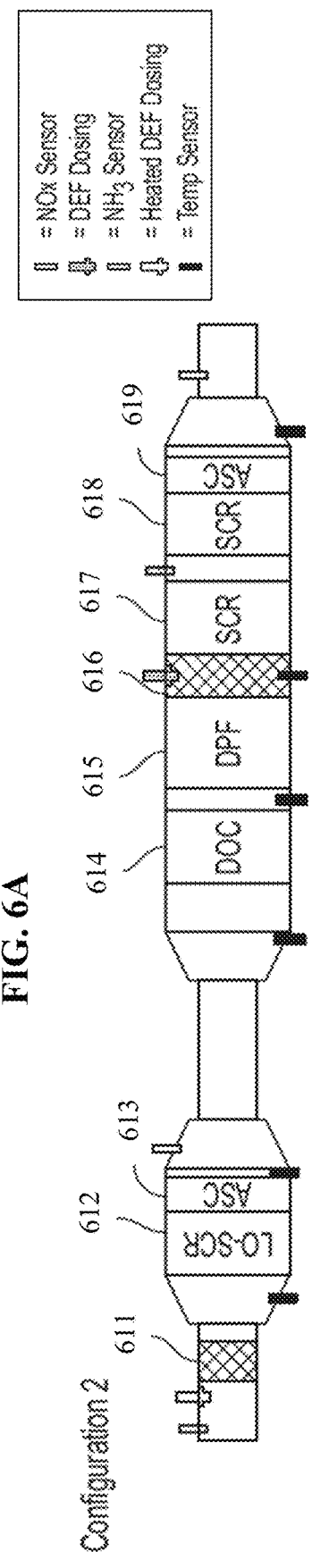

Referring to FIG. 6B, Configuration 2 includes, for an output of an ICE (e.g., ICE 110 of FIG. 1), an exhaust heating device 611, a LO-SCR 612, a first ASC 613, a DOC 614, a DPF 615, a first e-Heater 616, a first SCR 617, a second SCR 618, and a second ASC 619. In some cases, the exhaust heating device 611 is a second e-Heater. In some cases, the exhaust heating device 611 is a fuel burner.

Figure 6C:
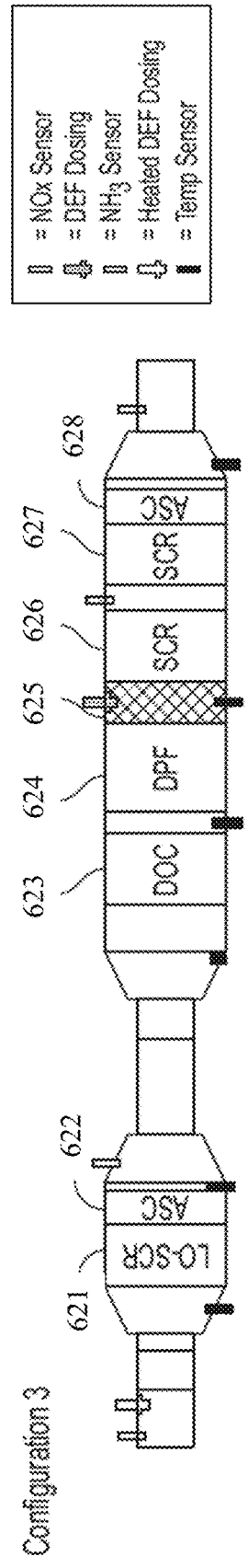

Referring to FIG. 6C, Configuration 3 includes, for an output of an ICE (e.g., ICE 110 of FIG. 1), a LO-SCR 621, a first ASC 622, a DOC 623, a DPF 624, an e-Heater 625, a first SCR 626, a second SCR 627, and a second ASC 628.

Figures 6D, 6E, 6F:
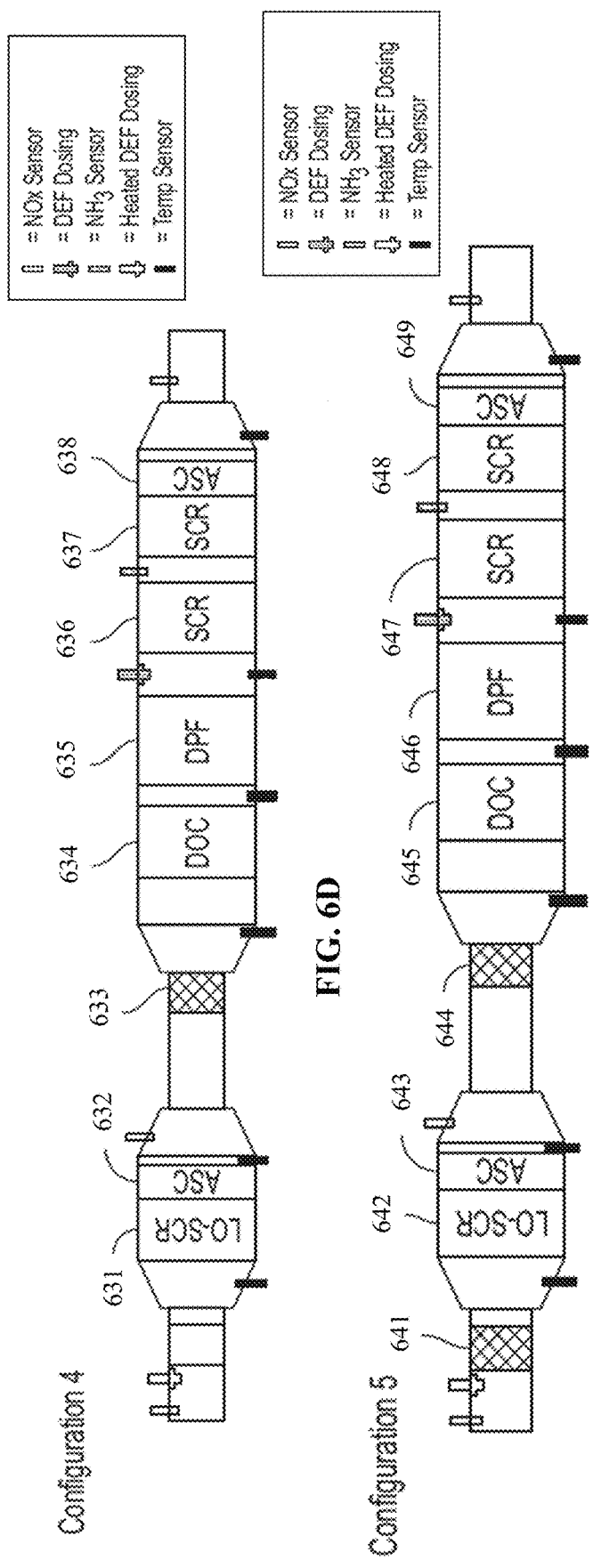

Referring to FIG. 6D, Configuration 4 includes, for an output of an ICE (e.g., ICE 110 of FIG. 1), a LO-SCR 631, a first ASC 632, an exhaust heating device 633, a DOC 634, a DPF 635, a first SCR 636, a second SCR 637, and a second ASC 638. In some cases, the exhaust heating device 633 is an e-Heater. In some cases, the exhaust heating device 633 is a fuel burner.

Referring to FIG. 6E, Configuration 5 includes, for an output of an ICE (e.g., ICE 110 of FIG. 1), a first exhaust heating device 641, a LO-SCR 642, a first ASC 643, a second exhaust heating device 644, a DOC 645, a DPF 646, a first SCR 647, a second SCR 648, and a second ASC 649. In some cases, the first exhaust heating device 641 is an e-Heater. In some cases, the first exhaust heating device 641 is a fuel burner. In some cases, the second exhaust heating device 644 is an e-Heater. In some cases, the second exhaust heating device 644 is a fuel burner.

Referring to FIG. 6F, Configuration 6 includes, for an output of an ICE (e.g., ICE 110 of FIG. 1), a first exhaust heating device 651, a first DOC 652, a LO-SCR device 653, a first ASC 654, a second DOC 655, a second e-Heater 656, a DPF 657, a first SCR device 658, a second SCR device 659, and a second ASC 660. The first exhaust heating device 651 may be an e-Heater or a fuel burner.

FIG. 7 illustrates a timing diagram for an example operation from cold start. Referring to FIG. 7, operation of a vehicle hybrid powertrain, such as hybrid powertrain system 100 of FIG. 1, from cold start is shown. It should be noted that the timing diagram does not illustrate exact values and that the operations are simplified for illustrative purposes (e.g., additional components may be involved and additional processes may occur during the cold start operation). The diagram of FIG. 7 follows electrical drivetrain power output 711, ICE power output 712, exhaust heating device setpoint 713 (of a separate exhaust heating device and/or the ICE operating as the heating device), and SCR device temperature 714 during a vehicle cold start where an electrical drivetrain of the vehicle hybrid powertrain has sufficient power to fulfil a vehicle drive load. The shaded region 710 illustrates an effective temperature range for the SCR device.

At time 701, the vehicle is OFF and the electrical drivetrain power output 711, the ICE power output 712, the exhaust heating device setpoint 713, and the SCR device temperature 714 are all at a base level.

At time 702, the vehicle is turned "ON". Because the vehicle is in cold start, the SCR device temperature is not within the effective temperature range 710. Therefore, the vehicle drive load is fulfilled by the electrical drivetrain. The electrical drivetrain power output 711 spikes at time 702, illustrating the power output to support the vehicle drive load. At time 702, when the vehicle turns "ON", the heating device setpoint level spikes, illustrating that the exhaust heating device has been turned on to provide heat to the aftertreatment system (e.g., aftertreatment system 130 of FIG. 1) is provided at a first setpoint to heat the SCR device. At time 702, there is a small increase in ICE power output 712, which illustrates that the ICE is being operated in idle (or ICE pulsing mode) to provide air flow to the aftertreatment system. At time 702, the SCR device temperature 714 begins to increase, illustrating that the heat applied by the exhaust heating device is heating the SCR device, and increasing the SCR device temperature.

At time 703, the SCR device temperature 714 has reached a temperature within the effective temperature range 710. At time 703, the exhaust heating device setpoint 713 drops, illustrating that the exhaust heating device has been set to a lower temperature setpoint because the SCR device is within the effective temperature range 710, and thus does not require the same amount of heat as when the SCR device temperature 714 was lower. While the SCR device temperature 714 is within the effective temperature range 710, the SCR device can effectively treat exhaust released by the ICE. At time 703, the ICE power output 712 increases while the electrical drivetrain power output 711 drops to base level. These simultaneous changes in ICE power output 712 and electrical drivetrain power output 711 illustrate that the ICE is now being used to fulfil the vehicle drive load (as opposed to the electrical drivetrain). Since the SCR device temperature 714 is within effective temperature range 710, the SCR device can effectively treat the exhaust from the ICE. The ICE can now be used to fulfil the drive load of the vehicle, while maintaining low emissions levels.

While it is shown in FIG. 7 that the vehicle power load fulfilment was switched between the electrical drivetrain to the ICE, this is merely an example for illustrative purposes. In some cases, the electrical drivetrain will continue to fulfil the vehicle power load. Additionally, in some cases, even when the vehicle drive load is fulfilled by the ICE at time 703, the electrical drivetrain power output 711 may not fall to base level, as the electrical drivetrain power may be used for another function.

At time 704, the SCR device temperature 714 exceeds the highest temperature of the effective temperature range 710. As a result, the exhaust heating device setpoint 713 falls to base level, illustrating that the exhaust heating device has been turned off.

Figure 8:
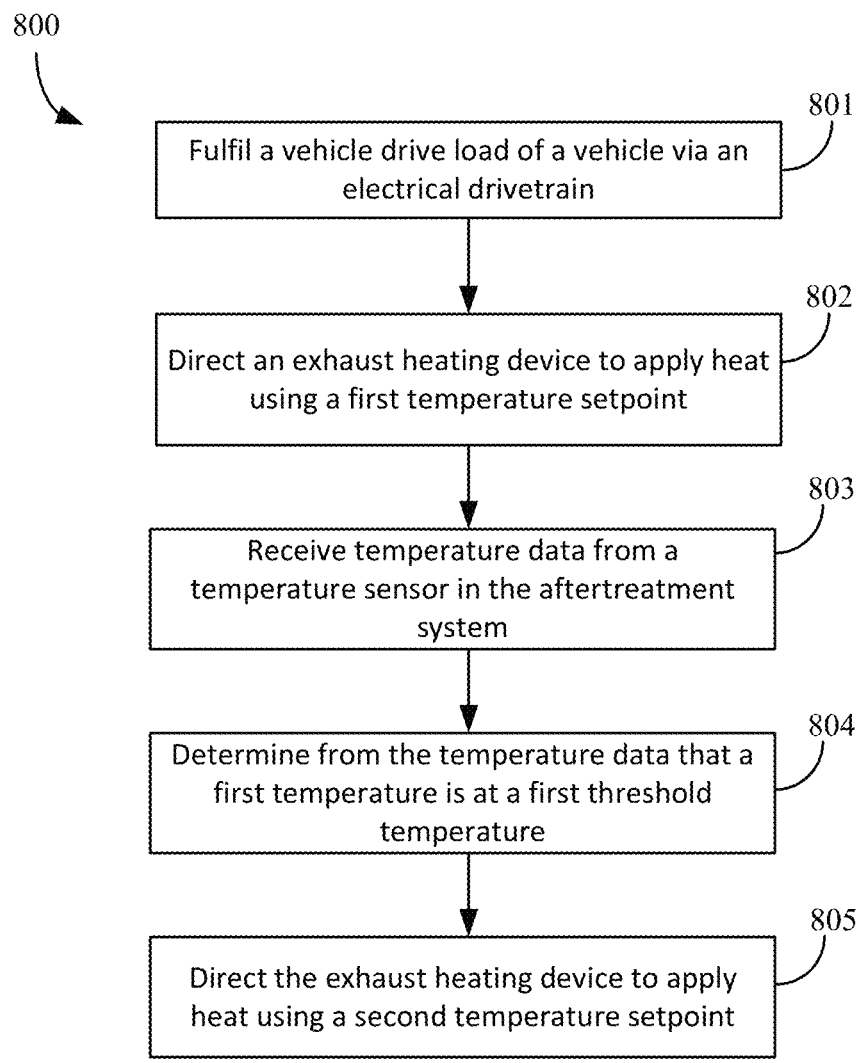
FIG. 8 illustrates a method of two-tier heating of a SCR device in a hybrid powertrain.

As mentioned above, there are several strategies that can be employed for effectively heating up a SCR device. One strategy is a "two-tier" heating strategy. FIG. 8 illustrates a method of two-tier heating of a SCR device in a hybrid powertrain. This two-tier heating strategy (e.g., method 800) can be carried out by a control system (e.g., control system 140 of FIG. 1, ICE controller 420 and/or heating controller 425 of FIG. 4A, or controller 460 of FIG. 4A) of a vehicle hybrid system. The described two-tier strategy directs an exhaust heating device (e.g., ICE 110 of FIG. 1 and FIGS. 4A-4B, or exhaust heating device of FIGS. 4A) to apply heat to an aftertreatment system (e.g., aftertreatment system 130 of FIG. 1). It should be understood that the two-tier heating strategy can be applied independently to multiple exhaust heating devices that may be in the system.

The exhaust heating device applies heat to the aftertreatment system to heat the SCR device to effective temperatures for $NO_x$ reduction. High $NO_x$ conversion begins between 200° C. and 280° C., depending on catalyst formulation and may be considered optimal between 250° C. and 450° C. It is desirable to sustain these temperatures at the SCR device.

Referring to FIG. 8, the method 800 includes fulfilling (801) a vehicle drive load of a vehicle with an electrical drivetrain (e.g., electrical drivetrain 120 of FIG. 1), directing (802) an exhaust heating device to apply heat using a first temperature setpoint, receiving (803) temperature data from a temperature sensor proximate to a SCR device (e.g., SCR device 135 of FIG. 1 or LO-SCR 512, 523, 532 and/or primary SCR devices of FIGS. 5B-5D) in the aftertreatment system, determining (804) from the temperature data that a first temperature is at a first threshold temperature, and directing (805) the exhaust heating device to apply heat using a second temperature setpoint.

In cases where the ICE of the hybrid powertrain is used to supply both air flow and temperature (i.e., acting as an exhaust heating device) instead of or in addition to a separate exhaust heating device, the directing (802) an exhaust heating device in an aftertreatment system to apply heat using a first temperature setpoint can include directing the ICE to operate in CDA mode in a manner that generates the desired first temperature setpoint.

Directing (802) an exhaust heating device in an aftertreatment system to apply heat using a first temperature setpoint can include directing the exhaust heating device (e.g., fuel burner, e-Heater) to apply heat at a first setpoint location. The setpoint location is the location in the aftertreatment system where heat enters the aftertreatment system. There are several locations in the aftertreatment system that would be a suitable setpoint location, including, but not limited to, at the SCR device (LO-SCR or primary SCR) mid-bed, at the SCR average (Avg.) (LO-SCR or primary SCR), at a DPF outlet, and at a DOC outlet.

The first temperature setpoint is the temperature target that the exhaust heating device is set to when applying heat to aftertreatment system. In some cases, the first temperature setpoint is higher than the effective temperature range of the SCR device. In some cases, the first temperature setpoint is within a range of 300-400° C. In some cases, the first temperature setpoint is within a range of 200-275° C. In some cases, the first temperature setpoint is within a range of 225-290° C. The threshold temperature is the temperature that triggers a change in operation (e.g., a change in the temperature setpoint. In some cases, a first threshold temperature is 275° C.

As seen in FIGS. 5A-5D and FIGS. 6A-6F, a DPF (e.g., DPF 605 of FIG. 6A, DPF 615 of FIG. 6B, DPF 624 of FIG. 6C, DPF 635 of FIG. 6D, DPF 646 of FIG. 6E, or DPF 657 of FIG. 6F) can be upstream and proximate to a primary SCR device in an aftertreatment system. A DPF is a large thermal mass that requires a substantial amount of heat before heat from the DPF can be transferred downstream to the SCR device. In some cases, the DPF contributes to the effectiveness of method 800 by assisting in heating up the primary SCR device because the DPF can act as a thermal reservoir to heat up (and maintain heat of) the proximate SCR device. In some cases, the temperature setpoint location is a DPF inlet, encouraging faster heat up of the DPF, which can act as a thermal reservoir to heat up (and maintain heat of) the proximate SCR device.

Receiving (803) temperature data from a temperature sensor proximate to a SCR device in the aftertreatment system can include receiving temperature data from a temperature sensor located at, the LO-SCR device inlet, the LO-SCR device mid-bed, the LO-SCR device Avg., the primary SCR device inlet, the primary SCR device mid-bed, the primary SCR device Avg., the DPF outlet, and/or the DOC outlet. In some cases, alternate locations within the aftertreatment system may be used in conjunction with algorithms to calculate expected temperatures at the alternate locations. Of course, multiple temperature sensors may be used by the controller.

Once the controller has received (803) the temperature data from the temperature sensor, the controller may determine (804) from the temperature data that a first temperature is at a first threshold temperature. The first threshold temperature is a predefined temperature that once reached, prompts the controller to direct the exhaust heating device to apply heat at a lower temperature setpoint.

Once the controller determines that a first temperature is at a first temperature threshold, the controller directs (805) the exhaust heating device to apply heat using a second temperature setpoint, which is less than the first temperature setpoint. By setting the second temperature setpoint, the controller prevents overheating to the aftertreatment system. In some cases, the second temperature setpoint is within a range of 190-225° C. In some cases, the second temperature setpoint is 0° C. (e.g., the control system directs the exhaust heating device to turn off). Operations to direct the exhaust heating device to apply heat at the second temperature setpoint can be carried out similarly to those described with respect to directing the exhaust heating device to apply heat at the first temperature setpoint.

In some cases, the controller performs a three-tier heating of a SCR device. The "three-tier" heating method expands on method 800, adding a second temperature setpoint and a second threshold temperature. While heat is applied at the second temperature setpoint, the control system receives second temperature data from the temperature sensor proximate to the SCR device and determines, from the second temperature data, that a second temperature is at a second threshold temperature which is less than the second temperature setpoint.

In some cases, once the control system determines that the second temperature is at a second threshold temperature, the control system directs the exhaust heating device to turn off. In some cases, once the control system determines that the second temperature is at a second threshold temperature, the control system directs the exhaust heating device to apply heat using a third temperature setpoint, which is less than the second temperature setpoint Table 1 illustrates example Two-Tier method temperature setpoints and threshold temperatures.

TABLE 1

|  | First Temp. Setpoint | First Threshold Temp. | Second Temp. Setpoint |
|---|---|---|---|
| (1) | 400° C. | 300° C. | 200° C. |
| (2) | 250° C. | — | 235° C. |

Table 2 illustrates example Three-Tier method temperature setpoints and threshold temperatures.

TABLE 2

|  | First Temp. Setpoint | First Threshold Temp. | Second Temp. Setpoint | Second Threshold Temp. | Third Temp. Setpoint |
|---|---|---|---|---|---|
| (1) | 400° C. | 275° C. | 300° C. | 285° C. | 200° C. |
| (2) | 300° C. | 275° C. | 250° C. | 240° C. | 200° C. |

Figure 9:
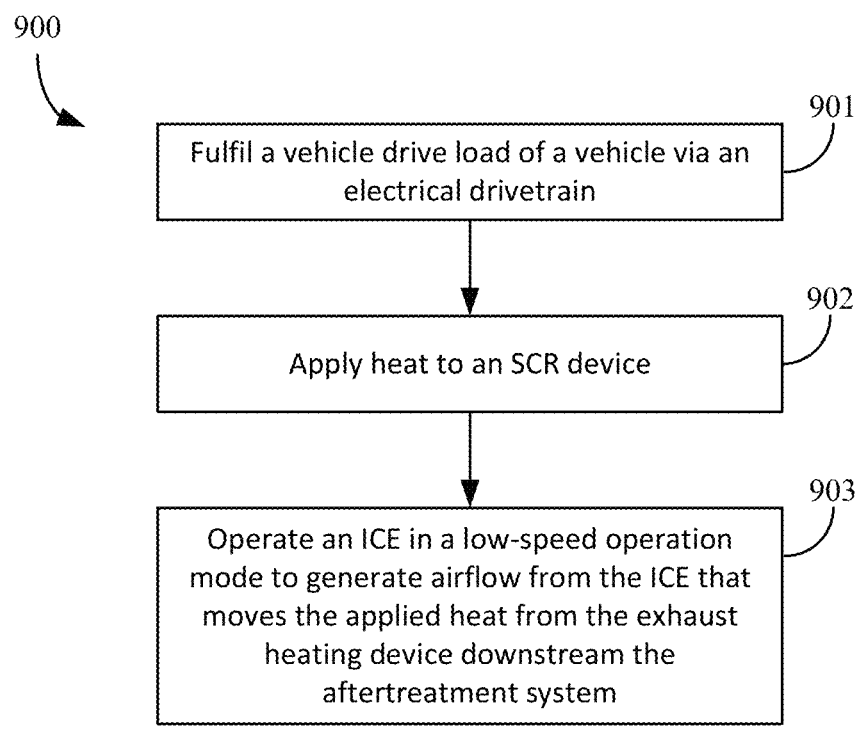
FIG. 9 illustrates an example method of increasing $NO_x$ reduction of a SCR device in a vehicle hybrid powertrain.

FIG. 9 illustrates an example method of increasing $NO_x$ reduction of a SCR device in a vehicle hybrid powertrain. The method 900 includes directing (901) an electrical drivetrain to fulfil a vehicle drive load of a vehicle, directing (902) an exhaust heating device to apply heat to an aftertreatment system of the vehicle, and directing (903) an ICE to operate in idle to generate airflow from the ICE that moves the applied heat from the exhaust heating device downstream the aftertreatment system.

The method 900 can be carried out by a control system (e.g., control system 140 of FIG. 1 or ICE controller 420 or heating controller 425 of FIG. 4A) of a vehicle hybrid powertrain system (e.g., vehicle hybrid powertrain system 100 of FIG. 1, vehicle hybrid powertrain system 400 of FIG. 4A, or vehicle hybrid powertrain system 450 of FIG. 4B). The method 900 is particularly effective when the vehicle is in cold start, as it allows the vehicle power load to be fulfilled by an electric drivetrain (e.g., electrical drivetrain 120 of FIG. 1 and FIG. 4A-4B), while effectively providing the heat and airflow required to the aftertreatment system (e.g., aftertreatment system 130 of FIG. 1 and FIG. 4A-4B) to heat a SCR device (e.g., SCR device 135 of FIG. 1 and FIG. 4A-4B) to an effective temperature range.

Directing (901) an electrical drivetrain to fulfil a vehicle drive load of a vehicle includes directing the electrical drivetrain to power a wheel and axle of a vehicle. In some cases, the controller directs the electrical drivetrain to fulfil a vehicle drive load of a vehicle after receiving battery power status information of a battery in the electrical drivetrain in order to determine that the electrical drivetrain power is sufficient (e.g., as described with respect to method 300 of FIG. 3).

Directing (902) an exhaust heating device to apply heat to an aftertreatment system of the vehicle can include any of the methods for supplying temperature as described herein. The control system/controller can direct the exhaust heating device to apply heat at a first temperature to an aftertreatment system of the vehicle. In some cases, the controller directs (902) the exhaust heating device (e.g., ICE 110 of FIG. 1 or exhaust heating device 430 of FIG. 4A) to apply heat to an aftertreatment system of the vehicle after receiving temperature information (e.g., temperature information 440 of FIG. 4A-4B) of the aftertreatment system from temperature sensors located in the aftertreatment system. In some cases, the controller determines from the temperature information of the aftertreatment system that a SCR temperature of a SCR device is insufficient. In some cases, the temperature information indicates that the vehicle is in cold start.

In some cases, directing (902) an exhaust heating device to apply heat to an aftertreatment system of the vehicle includes performing the method 800 described in FIG. 8.

In some cases, directing (903) an ICE to operate in idle to generate airflow from the ICE that moves the applied heat from the exhaust heating device downstream the aftertreatment system includes directing the ICE to operate at idle. In some cases, the ICE is directed to operate at idle with fueling. In some cases, the ICE is directed to operate at "elevated idle mode". During "elevated idle" the RPMs of the ICE are increased over normal idle range (e.g., elevating from 600 RPMs during regular idle to 800 RPMs in elevated idle mode). In some cases, once the SCR is heated up to operating temperatures, elevated idle mode can be exited. Using elevated idle during vehicle cold start operation increases "heat flux" to the SCR device because more fuel is consumed by the ICE. In some cases, elevated idle mode is advantageous, because the increased RPMs of elevated idle may cool the SCR device by blowing air at cooler temperatures to the SCR device, prolonging the need to power the exhaust heating device. In some cases, control system may direct the ICE to run elevated idle mode while the ICE is performing CDA.

Idle (including elevated idle) can be used during the application of heat, including as described in the method 800 of FIG. 8.

The directing (903) step introduces airflow (e.g., airflow 415 of FIG. 4A-4B) to the aftertreatment system. This airflow helps disperse heat and regulate aftertreatment and SCR device temperatures to ensure that the SCR device is heated to the efficient temperature range. Because the drive load is simultaneously supported by the electrical drivetrain, the vehicle will still operate normally, while the ICE is freed up to perform functions that produce airflow to the aftertreatment system.

In some cases, the control system uses the ICE speed information to determine whether to direct the ICE to operate at a particular ICE speed or in idle. In some cases, the control system uses exhaust mass flowrate information to determine that airflow is needed in the aftertreatment system. In some cases, operations 902 and 903 can be used without fulfilling the vehicle drive load of operation 901 and instead be used as part of a pre-heating operation where the vehicle hybrid drivetrain (e.g., from battery) is used to support ICE operation.

Figure 10:
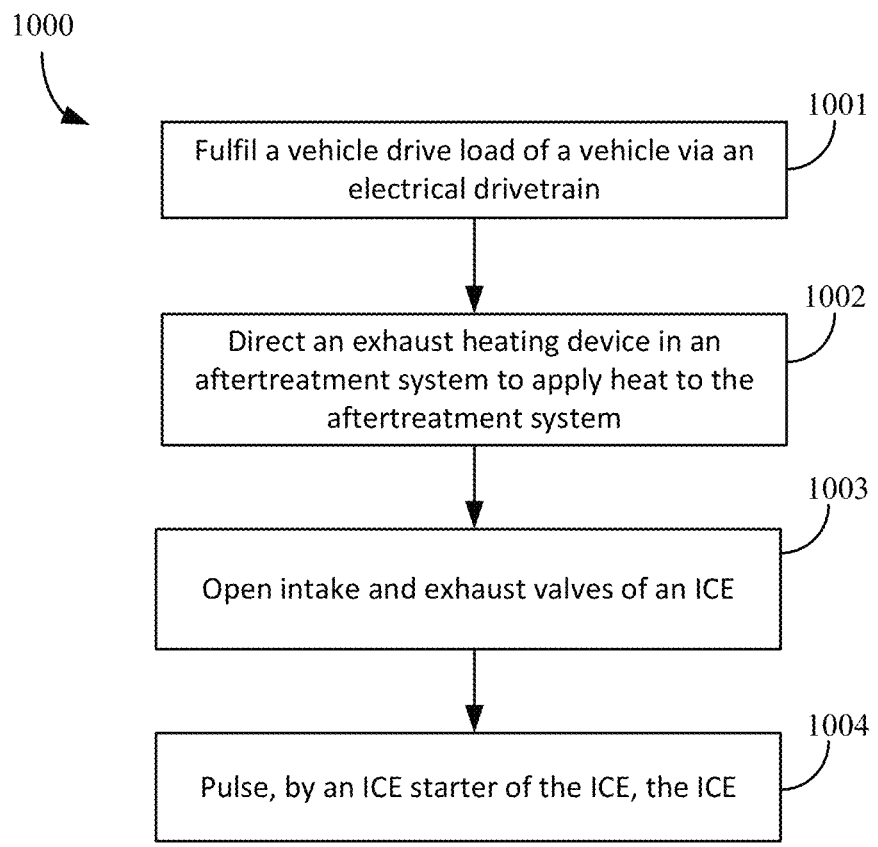
FIG. 10 illustrates method of providing airflow to the aftertreatment system using an internal combustion engine in engine pulsing mode.

FIG. 10 illustrates method of providing airflow to the aftertreatment system using an ICE in ICE pulsing mode. Referring to FIG. 10, the method 1000 includes fulfilling (1001) a vehicle drive load of a vehicle via an electrical drivetrain (e.g., electrical drivetrain 120 of FIG. 1), directing (1002), an exhaust heating device (e.g., ICE 110 of FIG. 1, exhaust heating device 430 of FIG. 4A) in an aftertreatment system (e.g., aftertreatment system 130 of FIG. 1) to apply heat to the aftertreatment system, opening (1003) one or more intake valves and one or more exhaust valves of an ICE (e.g., ICE 110 of FIG. 1), and pulsing (1004), by an ICE starter of the ICE, the ICE to generate airflow. Method 1000 can be performed by a control system (e.g., control system 140 of FIG. 1). In some cases, operations 1001, 1002, 1003, and 1004 can be used without fulfilling the vehicle drive load of operation 1001 and instead be used as part of a pre-heating operation where the vehicle hybrid drivetrain (e.g., from battery) is used to support ICE operation.

The method 1000 utilizes the ICE in an "ICE pulsing mode," which includes opening intake and exhaust valves and pulsing the ICE via an ICE starter to produce air. The ICE acts as air pump to provide airflow to the aftertreatment system.

Fulfilling (1001) the vehicle drive load of a vehicle via an electrical drivetrain includes directing an electrical drivetrain of a vehicle hybrid powertrain to provide power to an axle and wheels of the vehicle. Fulfilling (1001) the vehicle drive load of a vehicle with the electrical drivetrain enables the ICE of the vehicle hybrid powertrain to perform functions other than fulfilling the drive load. Additionally, when method 1000 is performed at cold start, fulfilling (1001) the vehicle drive load with the electrical drivetrain, as opposed to the ICE, prevents untreated exhaust from being released while the aftertreatment system, and the SCR device of the aftertreatment system is being heated.

In some cases, directing (1002) the exhaust heating device in the aftertreatment system to apply heat to the aftertreatment system includes directing the exhaust heating device to perform the two-tier heat up method 800 described in FIG. 8. As the aftertreatment system is being heated by the exhaust heating device, airflow (e.g., airflow 415 of FIG. 4A-4B) can be introduced to the aftertreatment system. The ICE can supply airflow to the aftertreatment system by operating in ICE pulsing mode. In ICE pulsing mode, the ICE produces airflow that can be introduced to the aftertreatment system. The controller can direct the ICE to operate in ICE pulsing mode.

To enter ICE pulsing mode, the ICE is directed to open (1003) one or more intake valves and one or more exhaust valves. While the one or more intake and one or more exhaust valves of the ICE are open, there is no fuel supplied to the ICE (e.g., fueling is eliminated). After the one or more intake valves and the one or more exhaust valves are open, the ICE may be pulsed at low speeds.

The controller of the vehicle hybrid powertrain directs the vehicle hybrid powertrain to pulse (1004), by an ICE starter of the ICE, the ICE to generate airflow. In some cases, the ICE is pulsed at an ICE starting speed, for example, at or above 550 rpms. The ICE starter may be, for example, an air starter, an electric motor, or the vehicle hybrid powertrain. Essentially, the ICE is turning ("cranking over") without fuel burning. Unlike cylinder cut-out (a similar ICE operation), the ICE pulsing mode utilizes low RPMs.

Advantageously, the method 1000 illustrates an additional method for using the ICE of a hybrid power train as an air pump. For example, on a 15 L ICE in ICE pulsing mode at a typical starting speed of 135 RPM can produce 74.4 kg/hr of air flow. As another example, spinning the ICE at 550 rpm yields 303 kg/hr air flow.

In some cases, the controller directs the ICE to operate in ICE pulsing mode at a 5 second pulse pattern, which includes directing the ICE to pulse for 5 seconds, and then turning off ICE pulsing mode for 25 seconds, such that there are 10 seconds of pulsing every minute. For example, directing the ICE to operate in 5 second pulse pattern every minute for 10 minutes can produce: 1.5 kg of air pulsing at ICE starting speed of 100 RPM, 2.1 kg of air pulsing at ICE starting speed of 150 RPM, 2.3 kg of air pulsing at ICE starting speed of 150 RPM, and 3.1 kg of air pulsing at ICE starting speed of 200 RPM. A hybrid-electric vehicle that cranks-over at 600 RPMs does not need to be pulsed as often as a diesel ICE cranking over at 100-150 RPMs.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A vehicle hybrid powertrain, comprising:
an internal combustion engine;
an electrical drivetrain;
a light-off selective catalytic reduction (LO-SCR) device, coupled to receive exhaust from the internal combustion engine; and
a control system that directs cylinder deactivation (CDA) of the internal combustion engine and controls heat applied to the LO-SCR device, wherein the control system further directs the internal combustion engine to operate in idle to generate airflow that transports heat applied to the LO-SCR device.

2. The vehicle hybrid powertrain of claim 1, wherein the idle is elevated idle.

3. The vehicle hybrid powertrain of claim 1, wherein the internal combustion engine is operated with a load at up to 3 bar BMEP.

4. The vehicle hybrid powertrain of claim 1, wherein the control system operates the internal combustion engine in idle while a vehicle drive load of a vehicle is fulfilled by the electrical drivetrain.

5. The vehicle hybrid powertrain of claim 1, wherein the vehicle hybrid powertrain is in a series hybrid configuration.

6. The vehicle hybrid powertrain of claim 1, wherein the vehicle hybrid powertrain is in a mixed powertrain configuration.

7. The vehicle hybrid powertrain of claim 1, wherein the vehicle hybrid powertrain is in a P2 configuration, a P3 configuration, or a switchable P2/P3 configuration.

8. The vehicle hybrid powertrain of claim 1, wherein the vehicle hybrid powertrain is in a P4 configuration.

9. The vehicle hybrid powertrain of claim 1, wherein the control system activates CDA of the internal combustion engine, wherein heat produced by CDA of the internal combustion engine is applied to the LO-SCR device.

10. A vehicle hybrid powertrain, comprising:
an internal combustion engine;
an electrical drivetrain;
a light-off selective catalytic reduction (LO-SCR) device, coupled to receive exhaust from the internal combustion engine;
an e-Heater upstream from the LO-SCR device; and
a control system that directs cylinder deactivation (CDA) of the internal combustion engine and controls heat applied to the LO-SCR device.

11. The vehicle hybrid powertrain of claim 10, wherein the control system comprises a processor and memory, the memory storing instructions that when executed by the processor, direct the control system to:
apply heat to the LO-SCR device using the e-Heater;
apply heat to the LO-SCR device using the internal combustion engine in a CDA mode; and
operate the internal combustion engine in idle to generate airflow from the internal combustion engine that transports the applied heat through the LO-SCR device.

12. A vehicle hybrid powertrain, comprising:
an internal combustion engine;
an electrical drivetrain;
a light-off selective catalytic reduction (LO-SCR) device, coupled to receive exhaust from the internal combustion engine;
a primary SCR device that is downstream from the LO-SCR device; and
a control system that directs cylinder deactivation (CDA) of the internal combustion engine and controls heat applied to the LO-SCR device.

13. The vehicle hybrid powertrain of claim 12, further comprising a fuel burner downstream from the LO-SCR device, wherein the fuel burner is upstream from the primary SCR device.

14. The vehicle hybrid powertrain of claim 13, wherein the control system comprises a processor and memory, the memory storing instructions that when executed by the processor, direct the control system to:
apply heat to the LO-SCR device using the internal combustion engine in CDA mode;
apply heat to the primary SCR device using the fuel burner; and
operate the internal combustion engine in idle to generate airflow from the internal combustion engine that transports the applied heat through the LO-SCR device and through the primary SCR device.

15. A vehicle hybrid powertrain, comprising:
an internal combustion engine;
an electrical drivetrain;
a light-off selective catalytic reduction (LO-SCR) device, coupled to receive exhaust from the internal combustion engine; and
a control system that directs cylinder deactivation (CDA) of the internal combustion engine and controls heat applied to the LO-SCR device, wherein the control system comprises a processor and memory, the memory storing instructions that when executed by the processor direct the control system to:
apply heat using a first temperature setpoint in an aftertreatment system, wherein the aftertreatment system comprises the LO-SCR device and a primary SCR device;
while the heat is applied at the first temperature setpoint, receive temperature data from a temperature sensor proximate to the LO-SCR device or the primary SCR device in the aftertreatment system;
determine from the temperature data that a first temperature is at a first threshold temperature which is less than the first temperature setpoint; and
after determining that the first temperature is at the first threshold temperature, apply heat using a second temperature setpoint which is less than the first temperature setpoint.

16. The vehicle hybrid powertrain of claim 15, wherein the first temperature setpoint and the second temperature setpoint are applied by directing the internal combustion engine to perform cylinder deactivation.

17. The vehicle hybrid powertrain of claim 15, wherein the first temperature setpoint and the second temperature setpoint are applied by controlling a fuel burner or e-Heater.

18. The vehicle hybrid powertrain of claim 15, wherein the instructions further direct the control system to direct the internal combustion engine to apply airflow to the aftertreatment system to transport the applied heat downstream the aftertreatment system.

19. The vehicle hybrid powertrain of claim 18, wherein the airflow is produced by the internal combustion engine operating in idle.

20. The vehicle hybrid powertrain of claim 18, wherein the airflow is produced by the internal combustion engine in an ICE pulsing mode.

21. The vehicle hybrid powertrain of claim 15, wherein the first threshold temperature is 275° C.

22. The vehicle hybrid powertrain of claim 15, wherein the first temperature setpoint is within a range of 225-290° C.

23. The vehicle hybrid powertrain of claim 15, wherein the second temperature setpoint is 225° C.

24. The vehicle hybrid powertrain of claim 15, wherein the heat applied at a first temperature setpoint is applied at a LO-SCR inlet, LO-SCR mid-bed, LO-SCR Avg, primary SCR inlet, primary SCR mid-bed, primary SCR Avg, a diesel particulate filter (DPF) outlet, or a diesel oxidation catalyst (DOC) outlet.

25. The vehicle hybrid powertrain of claim 15, wherein the temperature sensor is located at a LO-SCR inlet, LO-SCR mid-bed, LO-SCR Avg, primary SCR inlet, primary SCR mid-bed, primary SCR Avg, a DPF outlet, or a DOC outlet.

26. The vehicle hybrid powertrain of claim 15, wherein the instructions further direct the control system to:
   while heat is supplied at the second temperature setpoint, receive second temperature data from the temperature sensor proximate to the LO-SCR device or the primary SCR device in the aftertreatment system; and
   determine, from the second temperature data that a second temperature is at a second threshold temperature which is less than the second temperature setpoint.

27. A vehicle hybrid powertrain, comprising:
   an internal combustion engine;
   an electrical drivetrain;
   a light-off selective catalytic reduction (LO-SCR) device, coupled to receive exhaust from the internal combustion engine; and
   a control system that directs cylinder deactivation (CDA) of the internal combustion engine and controls heat applied to the LO-SCR device, wherein the control system comprises a processor and memory, the memory storing instructions that when executed by the processor, direct the control system to:
      open at least one of one or more intake valves and one or more exhaust valves of the internal combustion engine; and
      pulse, by an internal combustion engine starter of the internal combustion engine, the internal combustion engine to generate airflow from the internal combustion engine that moves the applied heat downstream an aftertreatment system comprising the LO-SCR device.

28. The vehicle hybrid powertrain of claim 27, wherein the internal combustion engine starter is a vehicle hybrid powertrain.

29. The vehicle hybrid powertrain of claim 27, wherein pulsing the internal combustion engine to generate airflow from the internal combustion engine that moves the applied heat downstream the aftertreatment system pulses the internal combustion engine at an internal combustion engine starting speed.

* * * * *